United States Patent
Oki et al.

(10) Patent No.: US 12,129,184 B2
(45) Date of Patent: Oct. 29, 2024

(54) MOLYBDENUM SULFIDE POWDER AND METHOD FOR PRODUCING SAME, HEAVY-METAL ADSORBENT, PHOTOTHERMAL CONVERSION MATERIAL, DISTILLATION METHOD, OXYGEN REDUCTION CATALYST, AND CATALYST INK

(71) Applicant: DIC Corporation, Tokyo (JP)

(72) Inventors: Hironobu Oki, Chiba (JP); Yusuke Kano, Chiba (JP); Tomoki Dohi, Chiba (JP); Seiji Mizuta, Chiba (JP); Minoru Tabuchi, Chiba (JP); Jianjun Yuan, Chiba (JP); Masato Otsu, Chiba (JP)

(73) Assignee: DIC Corporation, Tokyo (JP)

( * ) Notice: Subject to any disclaimer, the term of this patent is extended or adjusted under 35 U.S.C. 154(b) by 59 days.

(21) Appl. No.: 17/762,736

(22) PCT Filed: Sep. 24, 2020

(86) PCT No.: PCT/JP2020/036036
§ 371 (c)(1),
(2) Date: Mar. 23, 2022

(87) PCT Pub. No.: WO2021/060377
PCT Pub. Date: Apr. 1, 2021

(65) Prior Publication Data
US 2022/0348476 A1 Nov. 3, 2022

(30) Foreign Application Priority Data
Sep. 24, 2019 (WO) .................. PCT/JP2019/037236

(51) Int. Cl.
*C01G 39/06* (2006.01)
*B01D 1/00* (2006.01)
(Continued)

(52) U.S. Cl.
CPC .......... *C01G 39/06* (2013.01); *B01D 1/0035* (2013.01); *B01J 20/0218* (2013.01);
(Continued)

(58) Field of Classification Search
None
See application file for complete search history.

(56) References Cited

U.S. PATENT DOCUMENTS

| | | | |
|---|---|---|---|
| 2004/0018306 A1 | 1/2004 | Tenne et al. |
| 2006/0120947 A1 | 6/2006 | Tenne et al. |

(Continued)

FOREIGN PATENT DOCUMENTS

| | | |
|---|---|---|
| CN | 103086436 | 5/2013 |
| CN | 105753053 | 7/2016 |

(Continued)

OTHER PUBLICATIONS

English translation of Tang et al. (CN 106064833) (Year: 2016).*
(Continued)

*Primary Examiner* — Ronak C Patel
(74) *Attorney, Agent, or Firm* — JCIPRNET

(57) ABSTRACT

A molybdenum sulfide powder according to the invention contains molybdenum disulfide having a 3R crystal structure. A heavy-metal adsorbent according to the invention contains molybdenum sulfide particles, and the molybdenum sulfide particles have a median diameter $D_{50}$ of 10 nm to 1,000 nm obtained by a dynamic light scattering type particle diameter distribution measuring device. A photothermal conversion material according to the invention contains a material containing molybdenum sulfide particles and generates heat by absorbing light energy.

16 Claims, 8 Drawing Sheets

(51) Int. Cl.
*B01J 20/02* (2006.01)
*B01J 20/28* (2006.01)
*B01J 20/30* (2006.01)
*B01J 27/051* (2006.01)
*B01J 35/00* (2024.01)
*B01J 35/02* (2006.01)
*B01J 35/10* (2006.01)
*B01J 35/23* (2024.01)
*B01J 35/50* (2024.01)
*B01J 35/61* (2024.01)
*B01J 37/20* (2006.01)
*C09K 5/14* (2006.01)
*F24S 60/30* (2018.01)

(52) U.S. Cl.
CPC ..... *B01J 20/0285* (2013.01); *B01J 20/28007* (2013.01); *B01J 20/28016* (2013.01); *B01J 20/28059* (2013.01); *B01J 20/3085* (2013.01); *B01J 27/051* (2013.01); *B01J 35/23* (2024.01); *B01J 35/50* (2024.01); *B01J 35/613* (2024.01); *B01J 37/20* (2013.01); *C09K 5/14* (2013.01); *F24S 60/30* (2018.05); *C01P 2002/72* (2013.01); *C01P 2002/74* (2013.01); *C01P 2004/04* (2013.01); *C01P 2004/17* (2013.01); *C01P 2004/24* (2013.01); *C01P 2004/61* (2013.01); *C01P 2004/62* (2013.01); *C01P 2004/64* (2013.01); *C01P 2006/12* (2013.01)

(56) References Cited

U.S. PATENT DOCUMENTS

| 2006/0163151 | A1 | 7/2006 | Kawasaki et al. |
| 2010/0227782 | A1 | 9/2010 | Tenne et al. |
| 2012/0329686 | A1 | 12/2012 | Tenne et al. |
| 2013/0109601 | A1 | 5/2013 | Tenne et al. |
| 2017/0373311 | A1 | 12/2017 | Salehi-Khojin et al. |

FOREIGN PATENT DOCUMENTS

| CN | 106830082 | 6/2017 |
| CN | 109368725 | 2/2019 |
| CN | 109647340 | 4/2019 |
| JP | 2004512250 | 4/2004 |
| JP | 2004277199 | 10/2004 |
| JP | 2010144957 | 7/2010 |
| JP | 2010538951 | 12/2010 |
| JP | 2016125679 | 7/2016 |
| JP | 2018508094 | 3/2018 |
| JP | 2019025436 | 2/2019 |
| WO | 2004039494 | 5/2004 |
| WO | 2018131429 | 7/2018 |

OTHER PUBLICATIONS

English translation of Qi et al. (CN 103086436) (Year: 2013).*
English translation of Qiao et al. (CN 109650450). (Year: 2019).*
"International Search Report (Form PCT/ISA/210) of PCT/JP2020/036036," mailed on Dec. 1, 2020, with English translation thereof, pp. 1-6.
Yu-Chuan Lin et al., "Wafer-scale MoS2 thin layers prepared by MoO3 sulfurization," Nanoscale, Aug. 2012, pp. 6637-6641.
Jie Ma, "REVO4, REBO3 and REPO4 (Re = Rare earth element) Nanomaterials Constructed via Solid Phase Hydrothermal Route and Their Fluorescence Properties," Doctoral Dissertation of Department of Chemistry, Tongji University, Mar. 2008, with English translation thereof, pp. 1-10.
M A Albiter et al., "Synthesis of MoS2 nanorods and their catalytic test in the HDS of dibenzothiophene," Nanotechnology, vol. 17, Jun. 2006, pp. 1-19.
Rou Jun Toh et al., "3R phase of MoS2 and WS2 outperforms the corresponding 2H phase for hydrogen evolution," Chemical communications, vol. 53, Feb. 2017, pp. 3054-3057.

\* cited by examiner

MOLYBDENUM SULFIDE POWDER AND METHOD FOR PRODUCING SAME, HEAVY-METAL ADSORBENT, PHOTOTHERMAL CONVERSION MATERIAL, DISTILLATION METHOD, OXYGEN REDUCTION CATALYST, AND CATALYST INK

CROSS-REFERENCE TO RELATED APPLICATION

This application is a 371 application of the International PCT application serial no. PCT/JP2020/036036, filed on Sep. 24, 2020, which claims the priority benefits of the International PCT application serial no. PCT/JP2019/037236, filed on Sep. 24, 2019. The entirety of each of the above-mentioned patent applications is hereby incorporated by reference herein and made a part of this specification.

TECHNICAL FIELD

The present invention relates to a molybdenum sulfide powder, a method for producing the same, an oxygen reduction catalyst, and a catalyst ink. The invention also relates to a heavy-metal adsorbent containing molybdenum sulfide particles. Further, the invention relates to a photothermal conversion material made of a material containing molybdenum sulfide particles and a distillation method using the photothermal conversion material.

BACKGROUND ART

Molybdenum sulfides represented by molybdenum disulfide ($MoS_2$) are well known as, for example, lubricants, steel additives, and molybdate raw materials. These molybdenum sulfides have been used in applications that make effective use of an advantage of being inert.

However, recently, focusing on the activity thereof, attempts have been made to apply the molybdenum sulfides to fine applications such as semiconductor materials and catalysts. Although such activity can be increased to some extent by refining a molybdenum sulfide obtained by any production method such as sulphurization of a molybdenum oxide or by breaking an aggregation of the molybdenum sulfide, in many cases, expected excellent performance cannot be obtained only by the above operations. Therefore, in order to exhibit more excellent performance for each purpose of use, methods for producing a molybdenum sulfide having a peculiar shape such as a single layer shape, a nanoflower shape, or a fullerene shape have been examined (see PTLs 1 and 2).

In the related art, a zeolite-based adsorbent, a titanosilicate-based adsorbent, and the like are known as a heavy-metal adsorbent for a water purifying material (PTL 3 and the like). These adsorbents are described to have excellent adsorption performance for heavy metals such as lead.

Further, various devices are known from a power generation device to a hot water supply device for general households as a form in which the temperature of a fluid is raised by sunlight, heat is temporarily stored therein, and steam is generated, and the heat is transported to another place or stored as it is and used later, instead of generating electricity directly from the sunlight.

For example, PTL 4 proposes a solar heat collecting method in which the sunlight is received by a metal or a metal oxide nanoparticle dispersion and the sunlight is converted into heat energy in the nanoparticle dispersion.

Further, PTL 5 proposes a sunlight-absorbing fluid in which titanium nitride nanoparticles are dispersed in a liquid, and which absorbs and stores light energy obtained by irradiation, and a distillation method using the sunlight-absorbing fluid. Distillation requires a large amount of energy because the distillation requires evaporation of the liquid. If all or part of the energy can be supplied by the sunlight, it is effective in energy saving.

CITATION LIST

Patent Literature

PTL 1: JP-A-2004-277199

PTL 2: JP-T-2004-512250

PTL 3: WO 2004/039494

PTL 4: JP-A-2010-144957

PTL 5: JP-A-2016-125679

SUMMARY OF INVENTION

Technical Problem

However, the production methods for obtaining the molybdenum sulfide having a peculiar shape disclosed in PTLs 1 and 2 are all complicated, and it is difficult to obtain such a molybdenum sulfide. In the case of an experiment in which a well-known literature is successfully traced, although the molybdenum sulfide in the form of fine particles is obtained at first glance on an electron micrograph, the aggregation is actually severe and the expected catalytic performance cannot be obtained.

The zeolite-based adsorbent disclosed in PTL 3 adsorbs mineral components such as K and Ca, and is thus not suitable for use as the water purifying material. The titanosilicate-based adsorbent is expensive.

PTL 4 discloses that a simple substance or nanoparticles of an oxide of any metal species can be used, but no specific findings about material selection are disclosed as to what kind of metal or metal oxide nanoparticles should be used.

Further, the light absorption performance of the fluid in which the titanium nitride nanoparticles are dispersed, which is disclosed in PTL 5, is also unsatisfactory. In addition, gold, carbon nanotubes, and the like which are known as sunlight-absorbing materials, are expensive. Carbon black has poor dispersibility in water and aggregates over time, so the sunlight absorption performance thereof cannot be fully utilized.

Therefore, an object of the invention is to provide a molybdenum sulfide powder having excellent catalytic activity, particularly, oxygen reduction reaction (ORR) activity, a method for producing the same, an oxygen reduction catalyst, and a catalyst ink.

In addition, another object of the invention is to provide a heavy-metal adsorbent having selective adsorption performance, that is, high adsorption performance for heavy metals and low adsorption capacity for mineral components.

Further, still another object of the invention is to provide a photothermal conversion material having excellent light absorption performance and a distillation method.

Solution to Problem

The invention includes the following aspects.

[1] A molybdenum sulfide powder containing: molybdenum disulfide having a 3R crystal structure.

[2] The molybdenum sulfide powder according to the above [1], further containing: molybdenum disulfide having a 2H crystal structure and a 3R crystal structure.

[3] The molybdenum sulfide powder according to the above [2], in which in a spectrum obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[4] The molybdenum sulfide powder according to any one of the above [1] to [3], which has a specific surface area of 10 m²/g or more measured by a BET method.

[5] The molybdenum sulfide powder according to any one of the above [1] to [4], which has a median diameter $D_{50}$ of 10 nm to 1,000 nm obtained by a dynamic light scattering type particle diameter distribution measuring device.

[6] The molybdenum sulfide powder according to any one of the above [1] to [5], in which in a radial distribution function obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0.

[7] The molybdenum sulfide powder according to any one of the above [1] to [6], in which primary particles of molybdenum sulfide particles constituting the molybdenum sulfide powder have a string shape, a ribbon shape, or a sheet shape.

[8] A method for producing the molybdenum sulfide powder according to any one of the above [1] to [7], including: heating a molybdenum trioxide powder made of an aggregate of primary particles containing molybdenum trioxide having a β crystal structure at a temperature of 200° C. to 1,000° C. in the presence of a sulfur source.

[9] A method for producing the molybdenum sulfide powder according to any one of the above [1] to [7], including: heating a molybdenum trioxide powder made of an aggregate of primary particles containing molybdenum trioxide having a β crystal structure at a temperature of 100° C. to 800° C. in the absence of a sulfur source; and then heating the molybdenum trioxide powder at a temperature of 200° C. to 1,000° C. in the presence of the sulfur source.

[10] The method for producing a molybdenum sulfide powder according to the above [8] or [9], in which the primary particles of the molybdenum trioxide powder have an average particle diameter of 5 nm to 1,000 nm.

[11] The method for producing a molybdenum sulfide powder according to any one of the above [8] to [10], in which S has an amount of 500 mol % or more in the sulfur source with respect to 100 mol % of the amount of $MoO_3$ of the molybdenum trioxide powder.

[12] The method for producing a molybdenum sulfide powder according to any one of the above [8] to [11], in which a heating temperature in the presence of the sulfur source is 320° C. or higher.

[13] A heavy-metal adsorbent containing: molybdenum sulfide particles, in which
the molybdenum sulfide particles have a median diameter $D_{50}$ of 10 nm to 1,000 nm obtained by a dynamic light scattering type particle diameter distribution measuring device.

[14] The heavy-metal adsorbent according to the above [13], in which the molybdenum sulfide particles have a specific surface area of 10 m²/g or more measured by a BET method.

[15] The heavy-metal adsorbent according to the above [13] or [14], in which in a radial distribution function of the molybdenum sulfide particles obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0.

[16] The heavy-metal adsorbent according to any one of the above [13] to [15], in which the molybdenum sulfide particles contain molybdenum disulfide having a 3R crystal structure.

[17] The heavy-metal adsorbent according to the above [16], in which the molybdenum sulfide particles contain molybdenum disulfide having a 2H crystal structure and a 3R crystal structure.

[18] The heavy-metal adsorbent according to the above [17], in which in a spectrum of the molybdenum sulfide particles obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[19] The heavy-metal adsorbent according to the above [17] or [18], in which primary particles of the molybdenum sulfide particles have a string shape, a ribbon shape, or a sheet shape.

[20] A photothermal conversion material containing: a material containing molybdenum sulfide particles, in which the photothermal conversion material generates heat by absorbing light energy.

[21] The photothermal conversion material according to the above [20], in which the molybdenum sulfide particles have a median diameter $D_{50}$ of 10 nm to 1,000 nm obtained by a dynamic light scattering type particle diameter distribution measuring device.

[22] The photothermal conversion material according to the above [20] or [21], in which the molybdenum sulfide particles have a specific surface area of 10 m²/g or more measured by a BET method.

[23] The photothermal conversion material according to any one of the above [20] to [22], in which in a radial distribution function of the molybdenum sulfide particles obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0.

[24] The photothermal conversion material according to any one of the above [20] to [23], in which the molybdenum sulfide particles contain molybdenum disulfide having a 3R crystal structure.

[25] The photothermal conversion material according to the above [24], in which the molybdenum sulfide particles contain molybdenum disulfide having a 2H crystal structure and a 3R crystal structure.

[26] The photothermal conversion material according to the above [25], in which in a spectrum of the molybdenum sulfide particles obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[27] The photothermal conversion material according to the above [24] or [25], in which primary particles of the molybdenum sulfide particles have a string shape, a ribbon shape, or a sheet shape.

[28] The photothermal conversion material according to any one of the above [20] to [27], in which the material containing molybdenum sulfide particles is a light-absorbing fluid containing a liquid and the molybdenum sulfide particles dispersed in the liquid.

[29] The photothermal conversion material according to the above [28], in which a main component of the liquid is water.

[30] The photothermal conversion material according to the above [28] or [29], in which the molybdenum sulfide particles are contained in an amount of 0.01% by mass or more with respect to the light-absorbing fluid.

[31] A distillation method including: evaporating the liquid by irradiating the photothermal conversion material according to any one of the above [28] to [30] with sunlight followed by heating.

[32] An oxygen reduction catalyst containing: a molybdenum sulfide powder containing molybdenum disulfide having a 3R crystal structure.

[33] The oxygen reduction catalyst according to the above [32], further containing: a molybdenum sulfide powder containing molybdenum disulfide having a 2H crystal structure and a 3R crystal structure.

[34] The oxygen reduction catalyst according to the above [33], in which in a spectrum of the molybdenum sulfide powder obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[35] The oxygen reduction catalyst according to any one of the above [32] to [34], in which the molybdenum sulfide powder has a specific surface area of 10 $m^2/g$ or more measured by a BET method. [36] The oxygen reduction catalyst according to any one of the above [32] to [35], in which the molybdenum sulfide powder has a median diameter $D_{50}$ of 10 nm to 1,000 nm obtained by a dynamic light scattering type particle diameter distribution measuring device.

[37] The oxygen reduction catalyst according to any one of the above [32] to [36], in which in a radial distribution function of the molybdenum sulfide powder obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0.

[38] The oxygen reduction catalyst according to any one of the above [32] to [37], in which primary particles of molybdenum sulfide particles constituting the molybdenum sulfide powder have a string shape, a ribbon shape, or a sheet shape.

[39] A catalyst ink containing: the oxygen reduction catalyst according to any one of the above [32] to [38]; a polyelectrolyte; and a solvent.

Advantageous Effects of Invention

Therefore, the invention can provide a molybdenum sulfide powder excellent in oxygen reduction reaction (ORR) activity, a method for producing the molybdenum sulfide powder, an oxygen reduction catalyst, and a catalyst ink.

In addition, the invention can provide a heavy-metal adsorbent having selective adsorption performance, that is, high adsorption performance for heavy metals and low adsorption capacity for mineral components.

Further, the invention can provide a photothermal conversion material having excellent light absorption performance and a distillation method.

DESCRIPTION OF EMBODIMENTS

<Molybdenum Sulfide Powder>

Figure 1:
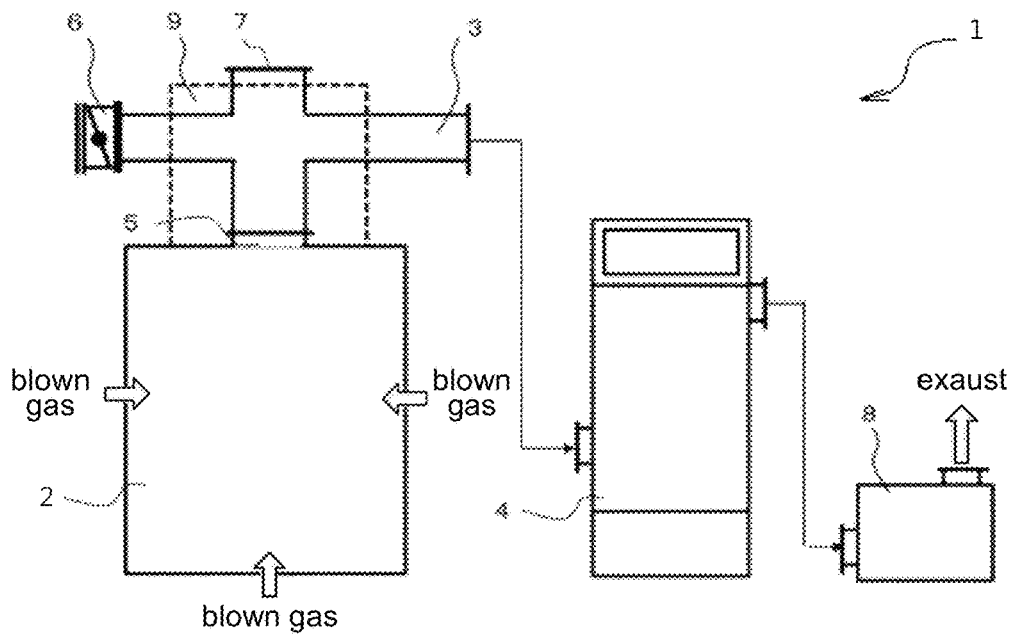
FIG. 1 is a schematic view of an example of an apparatus used for producing a molybdenum trioxide powder that is a raw material.

A molybdenum sulfide powder according to the present embodiment contains molybdenum disulfide having a 3R crystal structure. Further, the molybdenum sulfide powder according to the present embodiment contains molybdenum disulfide having a 2H crystal structure and a 3R crystal structure. In a spectrum obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more. Further, the molybdenum sulfide powder according to the present embodiment may have a crystal structure other than the 2H crystal structure and the 3R crystal structure of molybdenum disulfide, such as a 1H crystal structure.

Since molybdenum sulfide particles constituting the molybdenum sulfide powder according to the present embodiment have a 3R crystal structure which is a metastable structure, the molybdenum sulfide particles are excellent in oxygen reduction activity (ORR). Molybdenum sulfide particles constituting a usual commercially available molybdenum disulfide powder contain molybdenum sulfide having a 2H crystal structure, whereas the molybdenum sulfide particles constituting the molybdenum sulfide powder according to the present embodiment have the 3R crystal structure which is a metastable structure, which can be distinguished by a fact that, in the spectrum obtained from the powder X-ray diffraction (XRD) using the Cu-Kα rays as the X-ray source, both the peak in the vicinity of 39.5° and the peak in the vicinity of 49.5° include the synthetic peak of the 2H crystal structure and the 3R crystal structure.

In the molybdenum sulfide powder according to the present embodiment, primary particles of a molybdenum sulfide in a two-dimensional image when the molybdenum sulfide particles constituting the molybdenum sulfide powder are photographed with a transmission electron microscopy (TEM) may have a particle shape, a spherical shape, a plate shape, a needle shape, a string shape, a ribbon shape or a sheet shape by visual observation or an image photograph, or may have a combination of these shapes. The primary particles of the molybdenum sulfide preferably have a ribbon shape or a sheet shape. The shape of 50 primary particles of the molybdenum sulfide preferably has a size in the range of length (vertical)×width (horizontal=50 nm to 1,000 nm×3 nm to 100 nm on average, more preferably a size in the range of 100 nm to 500 nm×5 nm to 50 nm, and particularly preferably a size in the range of 150 nm to 400 nm×10 nm to 20 nm. The shape of the primary particles of the molybdenum sulfide preferably has a thickness in the range of 1 nm to 40 nm, more preferably a thickness in the range of 3 nm to 20 nm, and particularly preferably a thickness in the range of 5 nm to 10 nm. Here, the sheet shape means a thin layer shape. Further, the ribbon shape means a long thin layer shape. The string shape, the ribbon shape, or the sheet shape can increase the specific surface area of the molybdenum sulfide powder, and the molybdenum sulfide powder can be excellent in oxygen reduction reaction (ORR) activity. Here, the string shape means an elongated shape. The aspect ratio of the primary particles of the molybdenum sulfide, that is, the value of (length (vertical))/(width (horizontal)) is preferably 1.2 to 1,200, more preferably 2 to 800, still more preferably 5 to 400, and particularly preferably 10 to 200 on average of 50 particles.

Since the primary particles of the molybdenum sulfide particles do not have a simple spherical shape, but have the string shape, the ribbon shape, or the sheet shape having a large aspect ratio, the number of points where heavy metals are adsorbed increases, and adsorption performance for heavy metals is excellent, in particular, the adsorption performance for heavy metals such as lead, mercury, silver and gold is greatly improved.

The specific surface area of the molybdenum sulfide powder according to the present embodiment, which is measured by a BET method, is preferably 10 m²/g or more, more preferably 30 m²/g or more, and particularly preferably 40 m²/g or more. The larger the specific surface area of the molybdenum sulfide powder according to the present embodiment, the more excellent the oxygen reduction reaction (ORR) activity can be. The specific surface area of the molybdenum sulfide powder according to the present embodiment, which is measured by the BET method, may be 300 m²/g or less, 200 m²/g or less, or 100 m²/g or less.

The median diameter $D_{50}$ of the molybdenum sulfide particles constituting the molybdenum sulfide powder according to the present embodiment, which is obtained by a dynamic light scattering type particle diameter distribution measuring device, is preferably 10 nm to 1,000 nm. From the viewpoints of a large surface area and the reactivity with sulfur, the median diameter $D_{50}$ is preferably 600 nm or less, more preferably 500 nm or less, and particularly preferably 400 nm or less. The median diameter $D_{50}$ of the molybdenum sulfide particles constituting the molybdenum sulfide powder according to the present embodiment may be 10 nm or more, 20 nm or more, or 40 nm or more.

In a radial distribution function of the molybdenum sulfide powder according to the present embodiment, which is obtained from an extended X-ray absorption fine structure (EXAFS) spectrum of a K absorption edge of molybdenum, a ratio (I/II) of peak intensity I caused by Mo—S to peak intensity II caused by Mo—Mo is preferably more than 1.0, more preferably 1.1 or more, and particularly preferably 1.2 or more.

A conversion rate $R_C$ of the molybdenum sulfide powder according to the present embodiment to $MoS_2$ is preferably 70% or more, more preferably 80% or more, and particularly preferably 90% or more.

Since the conversion rate $R_C$ to $MoS_2$ is large, the molybdenum sulfide powder according to the present embodiment can be excellent in oxygen reduction reaction (ORR) activity.

The conversion rate $R_C$ of the molybdenum sulfide powder to $MoS_2$ can be obtained by a reference intensity ratio (RIR) method based on spectral data obtained by measuring the molybdenum sulfide powder with the X-ray diffraction (XRD). The conversion rate $R_C$ to $MoS_2$ can be obtained according to the following equation (1) using an RIR value $K_A$ of molybdenum sulfide ($MoS_2$), integrated intensity $I_A$ of a peak in the vicinity of $2\theta=14.4°\pm0.5°$ attributed to the plane (002) or the plane (003) of molybdenum sulfide ($MoS_2$), an RIR value $K_B$ of each molybdenum oxide ($MoO_3$ as a raw material, and $Mo_9O_{25}$, $Mo_4O_{11}$, $MoO_2$, etc. as reaction intermediates), and integrated intensity $I_B$ of the strongest line peak of each molybdenum oxide ($MoO_3$ as a raw material, and $Mo_9O_{25}$, $Mo_4O_{11}$, $MoO_2$, etc. as reaction intermediates).

$$R_C(\%)=(I_A/K_A)/(\Sigma(I_B/K_B))\times 100 \qquad (1)$$

Here, values described in the ICSD database can be used as the RIR values, and integrated X-ray powder diffraction software (PDXL) (Rigaku Corporation) can be used for analysis.

The molybdenum sulfide powder according to the invention has the following aspects.

[1] A molybdenum sulfide powder containing: molybdenum disulfide having a 3R crystal structure.

[2] The molybdenum sulfide powder according to the above [1], further containing: molybdenum disulfide having a 2H crystal structure and a 3R crystal structure, in which in a spectrum obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[3] The molybdenum sulfide powder according to the above [1] or [2], which has a specific surface area of 10 m$^2$/g or more, preferably 30 m$^2$/g or more, and more preferably 40 m$^2$/g or more, which is measured by a BET method.

[4] The molybdenum sulfide powder according to any one of the above [1] to [3], which has a median diameter $D_{50}$ of 10 nm to 1,000 nm, preferably 10 nm or more and 600 nm or less, more preferably 20 nm or more and 500 nm or less, and still more preferably 40 nm or more and 400 nm or less, which is obtained by a dynamic light scattering type particle diameter distribution measuring device.

[5] The molybdenum sulfide powder according to any one of the above [1] to [4], in which in a radial distribution function obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0, preferably 1.1 or more, and more preferably 1.2 or more.

[6] The molybdenum sulfide powder according to any one of the above [1] to [5], in which primary particles of molybdenum sulfide particles constituting the molybdenum sulfide powder have a string shape, a ribbon shape, or a sheet shape.

[7] The molybdenum sulfide powder according to any one of the above [1] to [6], in which the primary particles of molybdenum sulfide particles constituting the molybdenum sulfide powder have an average aspect ratio of 1.2 to 1,200, preferably 2 to 800, more preferably 5 to 400, and still more preferably 10 to 200.

[8] The molybdenum sulfide powder according to any one of the above [1] to [7], in which the molybdenum sulfide powder has a conversion rate $R_C$ to MoS$_2$ of 70% or more, preferably 80% or more, and more preferably 90% or more.

Oxygen Reduction Catalyst

The molybdenum sulfide powder can be suitably used as an oxygen reduction catalyst. Further, the molybdenum sulfide powder can also be used as an oxygen reduction catalyst in combination with a highly conductive carbon or metal.

The oxygen reduction catalyst according to the invention has the following aspect.

[11] An oxygen reduction catalyst containing: the molybdenum sulfide powder according to any one of the above [1] to [8].

<<Catalyst Ink>>

A catalyst ink according to the present embodiment contains the oxygen reduction catalyst, a polyelectrolyte, and a solvent.

As the polyelectrolyte, those generally used in a catalyst layer for a fuel cell can be used. Specific examples thereof include a perfluorocarbon polymer having a sulfonic acid group (for example, Nafion (registered trademark)), a hydrocarbon-based polymer compound having a sulfonic acid group, a polymer compound doped with an inorganic acid such as phosphoric acid, organic/inorganic hybrid polymers partially substituted with proton-conducting functional groups, and a proton conductor in which a polymer matrix is impregnated with a phosphoric acid solution or a sulfuric acid solution.

The solvent is not limited as long as the solvent can disperse the oxygen reduction catalyst and the polyelectrolyte and can be applied to a base material for a working electrode to form the catalyst layer. Preferred examples of the solvent include alcohols such as 1-propanol, 2-propanol, 1-butanol, 2-butanol, 1-pentanol, 2-pentanol, 1-hexanol, 2-hexanol, 1-heptanol, and 2-heptanol.

The catalyst ink according to the invention has the following aspect.

[21] A catalyst ink containing: an oxygen reduction catalyst containing the molybdenum sulfide powder according to any one of the above [1] to [8]; a polyelectrolyte; and a solvent.

<Method for Producing Molybdenum Sulfide Powder>

A production method according to the present embodiment is a method for producing the molybdenum sulfide powder, and includes heating a molybdenum trioxide powder made of an aggregate of primary particles containing molybdenum trioxide having a β crystal structure at a temperature of 200° C. to 1,000° C. in the presence of a sulfur source.

The molybdenum trioxide powder used in the method for producing a molybdenum sulfide powder according to the present embodiment is made of an aggregate of primary particles containing molybdenum trioxide having a β crystal structure. Since the molybdenum trioxide powder has better reactivity with sulfur than a molybdenum trioxide powder having only α crystals as a crystal structure in the related art, and contains molybdenum trioxide having a β crystal structure, the conversion rate $R_C$ to MoS$_2$ can be increased in a reaction with the sulfur source.

The β crystal structure of molybdenum trioxide can be observed by the presence of a peak (in the vicinity of 2θ: 23.01°, No. 86426 (inorganic crystal structure database, ICSD)) attributed to the plane (011) of a β crystal of MoO$_3$ in a spectrum obtained by the powder X-ray diffraction (XRD) using the Cu-Kα rays as the X-ray source. An α crystal structure of molybdenum trioxide can be observed by the presence of a peak of the plane (021) (in the vicinity of 2θ:27.32°, No. 166363 (inorganic crystal structure database, ICSD)) of an α crystal of MoO$_3$.

Examples of the sulfur source include sulfur and hydrogen sulfide, which may be used alone or in combination of two.

The production method according the present embodiment may include heating the molybdenum trioxide powder made of the aggregate of the primary particles containing molybdenum trioxide having a β crystal structure at a temperature of 100° C. to 800° C. in the absence of the sulfur source, and then heating the molybdenum trioxide powder at a temperature of 200° C. to 1,000° C. in the presence of the sulfur source.

The heating time in the presence of the sulfur source may be 1 to 20 hours, 2 to 15 hours, or 3 to 10 hours as long as the sulfurization reaction proceeds sufficiently.

In the production method according to the present embodiment, the average particle diameter of the primary particles of the molybdenum trioxide powder is preferably 5 nm to 1,000 nm.

The average particle diameter of the primary particles of the molybdenum trioxide powder refers to an average value of primary particle diameters of 50 primary particles randomly selected when the molybdenum trioxide powder is photographed with a scanning electron microscope (SEM), the major axis (the Feret diameter of the longest portion observed) and the minor axis (the short Feret diameter in a direction perpendicular to the Feret diameter of the longest portion) of the minimum unit particles (that is, the primary particles) constituting aggregates on a two-dimensional image are measured, and an average value thereof is defined as the primary particle diameter.

In the method for producing a molybdenum sulfide powder according to the present embodiment, the feed ratio of the amount of S in the sulfur source to the amount of $MoO_3$ in the molybdenum trioxide powder is preferably set under conditions under which the sulfurization reaction proceeds sufficiently. With respect to 100 mol % of the amount of $MoO_3$ in the molybdenum trioxide powder, the amount of S in the sulfur source is preferably 500 mol % or more, more preferably 600 mol % or more, and still more preferably 700 mol % or more. With respect to 100 mol % of the amount of $MoO_3$ in the molybdenum trioxide powder, the amount of S in the sulfur source may be 3,000 mol % or less, 2,000 mol % or less, or 1,500 mol % or less.

In the production method according to the present embodiment, the heating temperature in the presence of the sulfur source may be any temperature at which the sulfurization reaction proceeds sufficiently, and is preferably 320° C. or higher, more preferably 340° C. or higher, and particularly preferably 360° C. or higher. The heating temperature may be 320° C. to 1,000° C., 340° C. to 800° C., or 360° C. to 600° C.

In the method for producing a molybdenum sulfide powder according to the present embodiment, the average particle diameter of the primary particles of the molybdenum trioxide powder is preferably 1 µm or less. From the viewpoint of the reactivity with sulfur, the average particle diameter is more preferably 600 nm or less, still more preferably 400 nm or less, and particularly preferably 200 nm or less. The average particle diameter of the primary particles of the molybdenum trioxide powder may be 10 nm or more, 20 nm or more, or 40 nm or more.

In the method for producing a molybdenum sulfide powder according to the present embodiment, the molybdenum trioxide powder preferably has a $MoO_3$ content of 99.6% or more as measured by a fluorescent X-ray (XRF), whereby the conversion rate $R_C$ to $MoS_2$ can be increased, and it is possible to obtain molybdenum sulfide having high purity and good storage stability, which is not likely to generate sulfide derived from impurities.

In the method for producing a molybdenum sulfide powder according to the present embodiment, the molybdenum trioxide powder preferably has a ratio (β (011)/α (021)) of intensity of a peak attributed to the plane (011) of the β crystal of $MoO_3$ to intensity of a peak attributed to the plane (021) of the α crystal of $MoO_3$ of 0.1 or more in the spectrum obtained by the powder X-ray diffraction (XRD) using the Cu-Kα rays as the X-ray source.

From the peak intensity attributed to the plane (011) of the β crystal of $MoO_3$ and the intensity of the peak attributed to the plane (021) of the α crystal of $MoO_3$, each maximum peak intensity is read to obtain the ratio (β (011)/α (021)).

In the molybdenum trioxide powder, the ratio (β 011)/α (021)) is preferably 0.1 to 10.0, more preferably 0.2 to 10.0, and particularly preferably 0.4 to 10.0.

The molybdenum trioxide powder preferably has a specific surface area of 10 $m^2/g$ to 100 $m^2/g$ measured by the BET method.

In the molybdenum trioxide powder, the specific surface area is preferably 10 $m^2/g$ or more, more preferably 20 $m^2/g$ or more, and still more preferably 30 $m^2/g$ or more from the viewpoint of reactivity with sulfur. In the molybdenum trioxide powder, the specific surface area is preferably 100 $m^2/g$ or less and may be 90 $m^2/g$ or less or 80 $m^2/g$ or less from the viewpoint of facilitation in production.

In the molybdenum trioxide powder, a ratio (I/II) of peak intensity I caused by Mo—O to peak intensity II caused by Mo—Mo is preferably more than 1.1 in the radial distribution function obtained from the extended X-ray absorption fine structure (EXAFS) spectrum of the K absorption edge of molybdenum.

As for the peak intensity I caused by Mo—O and the peak intensity II caused by Mo—Mo, each maximum peak intensity is read to obtain the ratio (UII). The ratio (I/II) is considered to indicate that the β crystal structure of $MoO_3$ is obtained in the molybdenum trioxide powder, and the greater the ratio (UII), the better the reactivity with sulfur.

In the molybdenum trioxide powder, the ratio (I/II) is preferably 1.1 to 5.0, and may be 1.2 to 4.0 or 1.2 to 3.0.

Method for Producing Molybdenum Trioxide Powder

The molybdenum trioxide powder can be produced by vaporizing a molybdenum oxide precursor compound to form molybdenum trioxide vapor and cooling the molybdenum trioxide vapor.

The method for producing a molybdenum trioxide powder includes calcining a raw material mixture containing a molybdenum oxide precursor compound and a metal compound other than the molybdenum oxide precursor compound to vaporize the molybdenum oxide precursor compound so as to form molybdenum trioxide vapor. The ratio of the metal compound to 100% by mass of the raw material mixture is preferably 70% by mass or less in terms of oxide.

The method for producing a molybdenum trioxide powder can be suitably carried out by using a production apparatus 1 shown in FIG. 1.

FIG. 1 is a schematic view of an example of an apparatus used for producing the molybdenum trioxide powder. The production apparatus 1 includes a calcining furnace 2 for calcining a molybdenum oxide precursor compound or the raw material mixture to vaporize the molybdenum oxide precursor compound, a cross-shaped cooling pipe 3 connected to the calcining furnace 2 for powdering the molybdenum trioxide vapor vaporized by the calcining, and a collection device 4 as a collection unit for collecting the molybdenum trioxide powder aggregated in a powder form in the cooling pipe 3. At this time, the calcining furnace 2 and the cooling pipe 3 are connected to each other via a discharge port 5. Further, in the cooling pipe 3, an opening degree adjustment damper 6 is disposed at an outside air intake port (not shown) at a left end portion, and an observation window 7 is disposed at an upper end portion. An air exhauster 8, which is a first air blowing unit, is connected to the collection device 4. When the air exhauster 8 exhausts air, the collection device 4 and the cooling pipe 3 suction the air, and the outside air is blown into the cooling pipe 3 from the opening degree adjustment damper 6 of the cooling pipe 3. That is, the air exhauster 8 passively blows air to the cooling pipe 3 by exhibiting a suction function. In addition, the production apparatus 1 may include an external cooling device 9, which makes it possible to freely control cooling conditions for the molybdenum trioxide vapor generated from the calcining furnace 2.

The opening degree adjustment damper 6 takes in air from the outside air intake port and the molybdenum trioxide vapor vaporized in the calcining furnace 2 is cooled in an air atmosphere to obtain a molybdenum trioxide powder, whereby the ratio (I/II) can be made more than 1.1, and the β crystal structure of $MoO_3$ can be easily obtained in the molybdenum trioxide powder. In contrast, when the molybdenum trioxide vapor is cooled in a state where an oxygen concentration in a nitrogen atmosphere is low, for example, when the molybdenum trioxide vapor is cooled using liquid nitrogen, the oxygen defect density is likely to increase and the ratio (I/II) is likely to decrease.

The molybdenum oxide precursor compound is not particularly limited as long as it is a precursor compound for forming the molybdenum trioxide powder made of an aggregate of the primary particles containing molybdenum trioxide having a β crystal structure.

The molybdenum oxide precursor compound is not particularly limited as long as it forms molybdenum trioxide vapor by being calcined, and examples thereof include metal molybdenum, molybdenum trioxide, molybdenum dioxide, molybdenum sulfide, ammonium molybdate, phosphomolybdic acid ($H_3PMo_{12}O_{40}$), silicomolybdic acid ($H_4SiMo_{12}O_{40}$), aluminum molybdate, silicon molybdate, magnesium molybdate ($MgMo_nO_{3n+1}$ (n=1 to 3)), sodium molybdate ($Na_2Mo_nO_{3n+1}$ (n=1 to 3)), titanium molybdate, ferric molybdate, potassium molybdate ($K_2Mo_nO_{3n+1}$ (n=1 to 3)), zinc molybdate, boron molybdate, lithium molybdate ($Li_2Mo_nO_{3n+1}$ (n=1 to 3)), cobalt molybdate, nickel molybdate, manganese molybdate, chromium molybdate, cesium molybdate, barium molybdate, strontium molybdate, yttrium molybdate, zirconium molybdate, and copper molybdate. These molybdenum oxide precursor compounds may be used alone or in combination of two or more thereof. The form of the molybdenum oxide precursor compound is not particularly limited, and for example, the molybdenum oxide precursor compound may be in a powder form such as molybdenum trioxide, or may be in a liquid form such as an aqueous solution of ammonium molybdate. The molybdenum oxide precursor compound is preferably in the powder form having good handling properties and good energy efficiency.

As the molybdenum oxide precursor compound, commercially available α-crystal molybdenum trioxide is preferably used. Further, when ammonium molybdate is used as the molybdenum oxide precursor compound, the ammonium molybdate is converted by calcining into molybdenum trioxide that is thermodynamically stable, and thus the molybdenum oxide precursor compound to be vaporized becomes molybdenum trioxide.

Among these molybdenum oxide precursor compounds, molybdenum trioxide is preferably contained from the viewpoint of easily controlling the purity of the obtained molybdenum trioxide powder, the average particle diameter of the primary particles, and the crystal structure.

The molybdenum trioxide vapor can also be formed by calcining a raw material mixture containing a molybdenum oxide precursor compound and a metal compound other than the molybdenum oxide precursor compound.

The metal compound other than the molybdenum oxide precursor compound is not particularly limited, and examples thereof include an aluminum compound, a silicon compound, a titanium compound, a magnesium compound, a sodium compound, a potassium compound, a zirconium compound, an yttrium compound, a zinc compound, a copper compound, and an iron compound. Among these, it is preferable to use an aluminum compound, a silicon compound, a titanium compound, or a magnesium compound.

The molybdenum oxide precursor compound and the metal compound other than the molybdenum oxide precursor compound may form an intermediate, but even in this case, the intermediate is decomposed by calcining, and molybdenum trioxide can be vaporized in a thermodynamically stable form.

Among these compounds used as the metal compound other than the molybdenum oxide precursor compound, an aluminum compound is preferably used to prevent damage to a calcining furnace, and the metal compound other than the molybdenum oxide precursor compound may not be used to improve the purity of the molybdenum trioxide powder.

Examples of the aluminum compound include aluminum chloride, aluminum sulfate, basic aluminum acetate, aluminum hydroxide, boehmite, pseudo-boehmite, transition aluminum oxides (γ-aluminum oxide, δ-aluminum oxide, θ-aluminum oxide, etc.), α-aluminum oxide, and a mixed aluminum oxide having two or more crystal phases.

When a raw material mixture containing a molybdenum oxide precursor compound and a metal compound other than the molybdenum oxide precursor compound is calcined, the content of the molybdenum oxide precursor compound is preferably 40% by mass to 100% by mass, and may be 45% by mass to 100% by mass or 50% by mass to 100% by mass with respect to 100% by mass of the raw material mixture.

The calcining temperature varies depending on the molybdenum oxide precursor compound, the metal compound, and the like to be used, and the desired molybdenum trioxide powder, and is usually preferably a temperature at which the intermediate can be decomposed. For example, since aluminum molybdate can be formed as an intermediate when a molybdenum compound is used as the molybdenum oxide precursor compound and an aluminum compound is used as the metal compound, the calcining temperature is preferably 500° C. to 1,500° C., more preferably 600° C. to 1,550° C., and still more preferably 700° C. to 1,600° C.

The calcining time is not particularly limited, and may be, for example, 1 min to 30 h, 10 min to 25 h, or 100 min to 20 h.

The temperature rising rate varies depending on the molybdenum oxide precursor compound and the metal compound to be used, and the properties of the desired molybdenum trioxide powder, and is preferably 0.1° C./min to 100° C./min, more preferably 1° C./min to 50° C./min, and still more preferably 2° C./min to 10° C./min from the viewpoint of production efficiency.

The internal pressure in the calcining furnace is not particularly limited, and may be a positive pressure or a reduced pressure, but from the viewpoint of suitably discharging the molybdenum oxide precursor compound from the calcining furnace to the cooling pipe, the calcining is preferably performed under a reduced pressure. Specifically, the degree of pressure reduction is preferably −5,000 Pa to −10 Pa, more preferably −2,000 Pa to −20 Pa, and still more preferably −1,000 Pa to −50 Pa. When the degree of pressure reduction is −5,000 Pa or more, high airtightness and mechanical strength of the calcining furnace are not excessively required, and production costs can be reduced, which is preferable. In contrast, when the degree of pressure reduction is −10 Pa or less, clogging of the molybdenum oxide precursor compound at a discharge port of the calcining furnace can be prevented, which is preferable.

When a gas is blown into the calcining furnace during calcining, the temperature of the blown gas is preferably 5° C. to 500° C., and more preferably 10° C. to 100° C.

Further, the blowing speed of the gas is preferably 1 L/min to 500 L/min, and more preferably 10 L/min to 200 L/min with respect to 100 L of an effective volume of the calcining furnace.

The temperature of the vaporized molybdenum trioxide vapor varies depending on the type of the molybdenum oxide precursor compound to be used, and is preferably 200° C. to 2,000° C., and more preferably 400° C. to 1,500° C. When the temperature of the vaporized molybdenum trioxide vapor is 2,000° C. or lower, usually, the vapor tends to be easily turned into a powder by blowing outside air (0° C. to 100° C.) to the cooling pipe.

The discharge rate of the molybdenum trioxide vapor discharged from the calcining furnace can be controlled based on the amount of the molybdenum oxide precursor compound to be used, the amount of the metal compound to be used, the temperature of the calcining furnace, blowing of the gas into the calcining furnace, and the diameter of the discharge port of the calcining furnace. The discharge rate also varies depending on the cooling capacity of the cooling pipe, and the discharge rate of the molybdenum trioxide vapor discharged from the calcining furnace to the cooling pipe is preferably 0.001 g/min to 100 g/min, and more preferably 0.1 g/min to 50 g/min.

Further, the content of the molybdenum trioxide vapor contained in the gas discharged from the calcining furnace is preferably 0.01 mg/L to 1,000 mg/L, and more preferably 1 mg/L to 500 mg/L.

Next, the molybdenum trioxide vapor is cooled to form a powder.

The molybdenum trioxide vapor is cooled by lowering the temperature of the cooling pipe. In this case, examples of a cooling method include cooling by blowing a gas into the cooling pipe as described above, cooling by a cooling mechanism included in the cooling pipe, and cooling by an external cooling device.

The molybdenum trioxide vapor is preferably cooled in an air atmosphere. When the molybdenum trioxide vapor is cooled in an air atmosphere to form a molybdenum trioxide powder, the ratio (I/II) can be made more than 1.1, and the β crystal structure of $MoO_3$ can be easily obtained in the molybdenum trioxide powder.

The cooling temperature (temperature of the cooling pipe) is not particularly limited, and is preferably −100° C. to 600° C., and more preferably −50° C. to 400° C.

The cooling rate of the molybdenum trioxide vapor is not particularly limited, and is preferably 100° C./s to 100,000° C./s, and more preferably 1,000° C./s to 50,000° C./s. As the cooling rate of the molybdenum trioxide vapor increases, a molybdenum trioxide powder having a small particle diameter and a large specific surface area tends to be obtained.

When the cooling method is cooling by blowing a gas into the cooling pipe, the temperature of the blown gas is preferably −100° C. to 300° C., and more preferably −50° C. to 100° C.

Further, the blowing speed of the gas is preferably 0.1 m³/min to 20 m³/min, and more preferably 1 m³/min to 10 m³/min. When the blowing speed of the gas is 0.1 m³/min or more, a high cooling rate can be achieved, and clogging in the cooling pipe can be prevented, which is preferable. In contrast, when the blowing speed of the gas is 20 m³/min or less, the first air blowing unit (such as an air exhauster) which is expensive is no longer needed, and production costs can be reduced, which is preferable.

The powder obtained by cooling the molybdenum trioxide vapor is transported to the collection device for collection.

In the method for producing a molybdenum trioxide powder, the powder obtained by cooling the molybdenum trioxide vapor may be calcined again at a temperature of 100° C. to 320° C.

That is, the molybdenum trioxide powder obtained by the method for producing a molybdenum trioxide powder may be calcined again at a temperature of 100° C. to 320° C. The calcining temperature in the re-calcining may be 120° C. to 280° C. or 140° C. to 240° C. A calcining time in the re-calcining may be, for example, 1 min to 4 h, 10 min to 5 h, or 100 min to 6 h. However, a part of the β crystal structure of molybdenum trioxide disappears due to re-calcining, and when calcining is performed at a temperature of 350° C. or higher for 4 hours, the β crystal structure of the molybdenum trioxide powder disappears, the ratio (β(011)/α (021)) is 0, and the reactivity with sulfur is impaired.

The method for producing a molybdenum sulfide powder according to the invention has the following aspects.

[31] A method for producing the molybdenum sulfide powder according to any one of the above [1] to [8], including: heating a molybdenum trioxide powder made of an aggregate of primary particles containing molybdenum trioxide having a β crystal structure at a temperature of 200° C. to 1,000° C. in the presence of a sulfur source.

[32] A method for producing a molybdenum sulfide powder according to any one of the above [1] to [8], including: heating a molybdenum trioxide powder made of an aggregate of primary particles containing molybdenum trioxide having a β crystal structure at a temperature of 100° C. to 800° C. in the absence of a sulfur source; and then heating the molybdenum trioxide powder at a temperature of 200° C. to 1,000° C. in the presence of the sulfur source.

[33] The method for producing a molybdenum sulfide powder according to the above [31] or [32], in which the primary particles of the molybdenum trioxide powder have an average particle diameter of 5 nm to 1,000 nm, preferably 10 nm or more and 600 nm or less, more preferably 20 nm or more and 400 nm or less, and still more preferably 40 nm or more and 200 nm or less.

[34] The method for producing a molybdenum sulfide powder according to any one of the above [31] to [33], in which S has an amount of 500 mol % or more, preferably 600 mol % or more, and more preferably 700 mol % or more in the sulfur source with respect to 100 mol % of the amount of $MoO_3$ in the molybdenum trioxide powder.

[35] The method for producing a molybdenum sulfide powder according to any one of the above [31] to [34], in which a heating temperature in the presence of the sulfur source is 320° C. or higher, preferably 320° C. to 1,000° C., more preferably 340° C. to 800° C., and still more preferably 360° C. to 600° C.

<<Heavy-metal Adsorbent>>

A heavy-metal adsorbent according to the present embodiment contains molybdenum sulfide particles, and the molybdenum sulfide particles have a median diameter $D_{50}$ of 10 nm to 1,000 nm obtained by a dynamic light scattering type particle diameter distribution measuring device. The heavy-metal adsorbent according to the present embodiment exhibits selective adsorption performance, that is, high adsorption performance for heavy metals and low adsorption capacity for mineral components. It is considered that the high adsorption performance for heavy metals is due to a fact that the median diameter $D_{50}$ of the molybdenum sulfide particles is as small as 1,000 nm or less. It is considered that the above selective adsorption performance, that is, the adsorption performance for heavy metals is more remarkable than the adsorption capacity for mineral components, is due to, for example, a fact that the sulfur element in molybdenum sulfide has properties of easily adsorbing heavy metals.

The heavy metal that can be adsorbed by the heavy-metal adsorbent according to the present embodiment includes lead, iron, mercury, silver, gold, platinum, palladium, copper, chromium, cadmium, vanadium, manganese, cobalt, nickel, zinc, tin, tellurium, thallium, tantalum, uranium, and the like. The heavy-metal adsorbent according to the present embodiment is particularly excellent in adsorption performance for heavy metals such as lead, mercury, silver, and gold.

In addition, the mineral components that are difficult to be adsorbed by the heavy-metal adsorbent are, for example, calcium, potassium, sodium, and magnesium.

The median diameter $D_{50}$ of the molybdenum sulfide particles in the heavy-metal adsorbent according to the present embodiment, which is obtained by the dynamic light scattering type particle diameter distribution measuring device, is 10 nm to 1,000 nm, preferably 600 nm or less, more preferably 500 nm or less, and particularly preferably 400 nm or less from the viewpoint of the above effects. The median diameter $D_{50}$ of the molybdenum sulfide particles may be 10 nm or more, 20 nm or more, or 40 nm or more.

The molybdenum sulfide particles in the heavy-metal adsorbent according to the present embodiment preferably contain molybdenum disulfide having a 3R crystal structure. It is considered that since the 3R crystal structure is included, an edge portion of the crystal of the molybdenum sulfide particles increases, and an ion adsorption site increases, which contributes to further improvement of the adsorption performance for heavy metals. Further, since the 3R crystal structure is included, the adsorption performance for lead, mercury, silver, and gold among the heavy metals is remarkably improved. It is presumed that the improvement is due to the specific surface area derived from a nanostructure of the molybdenum sulfide particles.

Figure 4:
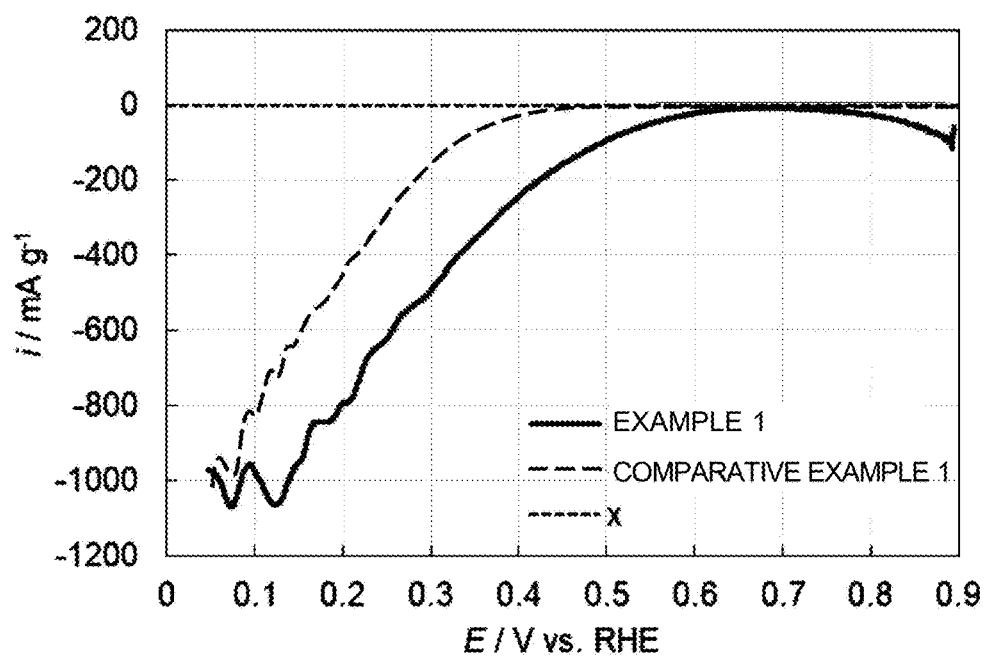
FIG. 4 is a graph showing an ORR current density (i/$mAg^{-1}$) with respect to an operating voltage (vs RHE) of a working electrode, which is obtained from the molybdenum sulfide powder.

Further, the molybdenum sulfide particles in the heavy-metal adsorbent according to the present embodiment preferably contain molybdenum disulfide having a 2H crystal structure and a 3R crystal structure. Most of the commercially available molybdenum disulfide particles have a particle diameter of more than 1 μm, are hexagonal solids, and have only a 2H crystal structure as a crystal structure, as shown in FIG. 4. On the contrary, the molybdenum sulfide particles produced by a "method for producing molybdenum sulfide particles" described later include the 2H crystal structure and the 3R crystal structure, and the median diameter $D_{50}$ can be easily adjusted to 10 nm to 1,000 nm.

Further, it is preferable that in a spectrum of the molybdenum sulfide particles in the heavy-metal adsorbent according to the present embodiment, which is obtained from the powder X-ray diffraction (XRD) using the Cu-Kα rays as the X-ray source, both the peak in the vicinity of 39.5° and the peak in the vicinity of 49.5° include a synthetic peak of the 2H crystal structure and the 3R crystal structure, and the half width is 1° or more. Further, the molybdenum sulfide particles may have a crystal structure other than the 2H crystal structure and the 3R crystal structure of molybdenum disulfide, such as a 1H crystal structure.

The molybdenum sulfide particles have the 3R crystal structure which is a metastable structure, which can be distinguished by a fact that, in the spectrum obtained from the powder X-ray diffraction (XRD) using the Cu-Kα rays as the X-ray source, both the peak in the vicinity of 39.5° and the peak in the vicinity of 49.5° include a synthetic peak (broad peak) of the 2H crystal structure and the 3R crystal structure.

The specific surface area of the molybdenum sulfide particles in the heavy-metal adsorbent according to the present embodiment, which is measured by the BET method, is preferably 10 $m^2/g$ or more, more preferably 30 $m^2/g$ or more, and particularly preferably 40 $m^2/g$ or more. The specific surface area of the molybdenum sulfide particles, which is measured by the BET method, may be 300 $m^2/g$ or less, 200 $m^2/g$ or less, or 100 $m^2/g$ or less.

It is considered that since the heavy-metal adsorbent in which the specific surface area of the molybdenum sulfide particles in the heavy-metal adsorbent according to the present embodiment, which is measured by the BET method, is 10 $m^2/g$ or more, can increase a contact area with the heavy metals, the adsorption performance for heavy metals is improved.

In a radial distribution function of the molybdenum sulfide particles in the heavy-metal adsorbent according to the present embodiment, which is obtained from the extended X-ray absorption fine structure (EXAFS) spectrum of the K absorption edge of molybdenum, the ratio (I/II) of the peak intensity I caused by Mo—S to the peak intensity II caused by Mo—Mo is preferably more than 1.0, more preferably 1.1 or more, and particularly preferably 1.2 or more.

In the crystal structure of molybdenum disulfide, the distance between Mo and S is almost the same in the 2H crystal structure and the 3R crystal structure due to a covalent bond, so that the peak intensity caused by Mo—S is the same in the 2H crystal structure and the 3R crystal structure in the extended X-ray absorption fine structure (EXAFS) spectrum of the K absorption edge of molybdenum.

On the other hand, since the 2H crystal structure of molybdenum disulfide is hexagonal, the hexagon is located 90° directly below the same hexagon of Mo atoms, and thus the distance between Mo and Mo is shorter, and the peak intensity II caused by Mo—Mo is stronger.

Conversely, since the 3R crystal structure of molybdenum disulfide is rhombohedral, the hexagon that is not just below 90° but half offset from the hexagon is present, and thus the distance between Mo and Mo is longer, and the peak intensity II caused by Mo—Mo is weaker.

The ratio (I/II) is smaller in a pure 2H crystal structure of molybdenum disulfide, but the ratio (I/II) is larger as molybdenum disulfide has the 3R crystal structure.

In the 3R crystal structure, since the hexagons of the Mo atoms in each of three layers are offset from each other by half of the hexagon, it can be expected that the interaction between the layers is small and the heavy metals are easily adsorbed compared to the 2H crystal structure in which hexagons of Mo atoms in two layers are arranged vertically and regularly.

Since the presence of molybdenum trioxide is considered to adversely influence the adsorption performance for heavy metals, the conversion rate $R_C$ of the molybdenum sulfide particles in the heavy-metal adsorbent according to the present embodiment to $MoS_2$ is preferably 70% or more, more preferably 80% or more, and particularly preferably 90% or more.

Since the molybdenum sulfide particles in the heavy-metal adsorbent according to the present embodiment have a large conversion rate $R_C$ to $MoS_2$, the molybdenum sulfide particles have adsorption performance for heavy metals better than other molybdenum disulfide materials or precursors thereof which may contain or generate molybdenum trioxide as a by-product.

The conversion rate $R_C$ of the molybdenum sulfide particles in the heavy-metal adsorbent according to the present embodiment to $MoS_2$ can be obtained in the same manner as the conversion rate $R_C$ of the molybdenum sulfide powder to $MoS_2$.

The heavy-metal adsorbent according to the present embodiment can adsorb, remove or recover heavy metal ions, heavy metals or heavy metal compounds contained in a heavy metal-containing solution, for example, a heavy metal-containing aqueous solution. Further, the heavy-metal adsorbent according to the present embodiment may adsorb, remove or recover heavy metals or heavy metal compounds contained in a heavy metal-containing gas.

The heavy-metal adsorbent according to the invention has the following aspect.

[41] A heavy-metal adsorbent containing: molybdenum sulfide particles, in which
the molybdenum sulfide particles have a median diameter $D_{50}$ of 10 nm to 1,000 nm, preferably 10 nm or more and 600 nm or less, more preferably 20 nm or more and 500 nm or less, and still more preferably 40 nm or more and 400 nm or less, which is obtained by a dynamic light scattering type particle diameter distribution measuring device.

[42] The heavy-metal adsorbent according to the above [41], in which the molybdenum sulfide particles have a specific surface area of 10 $m^2/g$ or more, preferably 30 $m^2/g$ or more, and more preferably 40 $m^2/g$ or more, which is measured by a BET method.

[43] The heavy-metal adsorbent according to the above [41] or [42], in which in a radial distribution function of the molybdenum sulfide particles obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0, preferably 1.1 or more, and more preferably 1.2 or more.

[44] The heavy-metal adsorbent according to any one of the above [41] to [43], in which the molybdenum sulfide particles contain molybdenum disulfide having a 3R crystal structure.

[45] The heavy-metal adsorbent according to the above [44], in which the molybdenum sulfide particles contain molybdenum disulfide having a 2H crystal structure and a 3R crystal structure, and
in a spectrum of the molybdenum sulfide particles obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[46] The heavy-metal adsorbent according to the above [44] or [45], in which primary particles of the molybdenum sulfide particles have a string shape, a ribbon shape, or a sheet shape.

[47] The heavy-metal adsorbent according to any one of the above [44] to [46], in which the primary particles of the molybdenum sulfide particles have an average aspect ratio of 1.2 to 1,200, preferably 2 to 800, more preferably 5 to 400, and still more preferably 10 to 200.

[48] The heavy-metal adsorbent according to any one of the above [44] to [47], in which a conversion rate $R_C$ of the molybdenum sulfide particles to $MoS_2$ is 70% or more, preferably 80% or more, and more preferably 90% or more.

(Method for Producing Molybdenum Sulfide Particles in Heavy-Metal Adsorbent)

The molybdenum sulfide particles in the heavy-metal adsorbent according to the present embodiment can be produced, for example, by heating molybdenum trioxide particles in which the average particle diameter of the primary particles is 5 nm to 1,000 nm in the presence of a sulfur source at a temperature of 200° C. to 1,000° C.

The average particle diameter of the primary particles of the molybdenum trioxide particles refers to an average value of primary particle diameters of 50 primary particles randomly selected when the molybdenum trioxide particles are photographed with a scanning electron microscope (SEM), the major axis (the Feret diameter of the longest portion observed) and the minor axis (the short Feret diameter in a direction perpendicular to the Feret diameter of the longest portion) of the minimum unit particles (that is, the primary particles) constituting aggregates on a two-dimensional image are measured, and an average value thereof is defined as the primary particle diameter.

Molybdenum trioxide particles used for producing the molybdenum sulfide particles in the heavy-metal adsorbent according to the present embodiment are preferably made of an aggregate of primary particles containing molybdenum trioxide having a β crystal structure. As the molybdenum trioxide particles, the molybdenum trioxide powder used in the method for producing a molybdenum sulfide powder is preferably used.

The molybdenum sulfide particles in the heavy-metal adsorbent according to the present embodiment can be produced from the molybdenum trioxide powder by the same method as described in the method for producing a molybdenum sulfide powder.

With the method for producing a molybdenum trioxide powder, the molybdenum trioxide particles suitable for producing the molybdenum sulfide particles in the heavy-metal adsorbent according to the present embodiment can be produced.

<<Photothermal Conversion Material>>

A photothermal conversion material according to the present embodiment is made of a material containing molybdenum sulfide particles, and generates heat by absorbing light energy. The photothermal conversion material according to the present embodiment contains the molybdenum sulfide particles, and thus has much more excellent light absorption performance than the known light absorption particles such as titanium nitride and carbon black. The photothermal conversion material according to the present embodiment has particularly high solar energy absorption performance.

The photothermal conversion material according to the present embodiment may be a material made of molybdenum sulfide particles, a material in which molybdenum sulfide particles are dispersed in a liquid, or a material in which molybdenum sulfide particles are supported on a carrier.

Hereinafter, the material in which molybdenum sulfide particles are dispersed in a liquid will be described in detail. The invention is not limited to the embodiment shown below.

<Light-absorbing Fluid>

In the photothermal conversion material according to the present embodiment, the material containing molybdenum sulfide particles is a light-absorbing fluid containing a liquid and molybdenum sulfide particles dispersed in the liquid.

In the photothermal conversion material according to the present embodiment, a main component of the liquid may be water. The main component of the liquid being water means that the ratio of water to the liquid is 50% by mass or more. The ratio of water to the liquid is preferably 50% by mass or more, more preferably 70% by mass or more, and still more preferably 90% by mass or more.

From the viewpoint that the photothermal conversion material according to the present embodiment exhibits remarkable light absorption performance as compared with a liquid in which molybdenum sulfide particles are not dispersed, the molybdenum sulfide particles are preferably contained in an amount of 0.01% by mass or more, more preferably 0.05% by mass or more, and still preferably 0.1% by mass or more with respect to the photothermal conversion material. The photothermal conversion material according to the present embodiment may contain the molybdenum sulfide particles in an amount of 5.0% by mass or less, 1.0% by mass or less, or 0.5% by mass or less with respect to the light-absorbing fluid. The photothermal conversion material according to the present embodiment preferably contains the molybdenum sulfide particles in an amount of 0.01% by mass or more and 5.0% by mass or less, more preferably contains 0.05% by mass or more and 1.0% by mass or less, and still preferably 0.1% by mass or more and 0.5% by mass or less with respect to the light-absorbing fluid.

The photothermal conversion material according to the present embodiment absorbs light energy obtained by irradiation. The photothermal conversion material according to the present embodiment contains the molybdenum sulfide particles and thus has much more excellent light absorption performance than the known light absorption particles such as titanium nitride and carbon black. The photothermal conversion material according to the present embodiment has particularly high solar energy absorption performance.

The photothermal conversion material according to the present embodiment does not require a separate member for light absorption/heat generation, and the photothermal conversion material itself can absorb light energy with high efficiency and store the light energy in the form of heat energy. Therefore, for example, solar energy can be collected with high efficiency by using a simple device configuration in which the photothermal conversion material according to the present embodiment is flowed through a transparent flow path such as a transparent pipe under sunlight irradiation.

(Molybdenum Sulfide Particles)

Commercially available molybdenum sulfide particles can be used as the molybdenum sulfide particles in the photothermal conversion material according to the present embodiment. The molybdenum sulfide particles absorb a wavelength portion (500 nm to 700 nm) having high solar energy particularly better than absorbing other substances, as compared with the light absorber in the related art. The photothermal conversion material according to the present embodiment can absorb light energy with higher efficiency and store the light energy in the form of the heat energy by nanosizing the molybdenum sulfide particles.

Specifically, the median diameter $D_{50}$ of the molybdenum sulfide particles in the photothermal conversion material according to the present embodiment (hereinafter, may be simply referred to as "median diameter $D_{50}$"), which is obtained by the dynamic light scattering type particle diameter distribution measuring device, is preferably 10 nm to 1,000 nm. From the viewpoint of a large surface area and excellent light absorption performance, the median diameter $D_{50}$ is preferably 600 nm or less, more preferably 500 nm or less, and particularly preferably 400 nm or less. The median diameter $D_{50}$ of the molybdenum sulfide particles in the photothermal conversion material according to the present embodiment may be 10 nm or more, 20 nm or more, or 40 nm or more.

The specific surface area of the molybdenum sulfide particles in the photothermal conversion material according to the present embodiment, which is measured by the BET method, is preferably 10 $m^2/g$ or more, more preferably 30 $m^2/g$ or more, and particularly preferably 40 $m^2/g$ or more. The larger the specific surface area of the molybdenum sulfide particles in the photothermal conversion material according to the present embodiment, the better the light absorption performance can be. The specific surface area of the molybdenum sulfide particles in the photothermal conversion material according to the present embodiment, which is measured by the BET method, may be 300 $m^2/g$ or less, 200 $m^2/g$ or less, or 100 $m^2/g$ or less.

In a radial distribution function of the molybdenum sulfide particles in the photothermal conversion material according to the present embodiment, which is obtained from the extended X-ray absorption fine structure (EXAFS) spectrum of the K absorption edge of molybdenum, the ratio (I/II) of the peak intensity I caused by Mo—S to the peak intensity II caused by Mo—Mo is preferably more than 1.0, more preferably 1.1 or more, and particularly preferably 1.2 or more.

The molybdenum sulfide particles in the photothermal conversion material according to the present embodiment contain molybdenum disulfide having a 3R crystal structure.

Further, the molybdenum sulfide particles in the photothermal conversion material according to the present embodiment contain molybdenum disulfide having a 2H crystal structure and a 3R crystal structure. It is preferable that in a spectrum obtained from the powder X-ray diffraction (XRD) using the Cu-Kα rays as the X-ray source, both the peak in the vicinity of 39.5° and the peak in the vicinity of 49.5° include a synthetic peak of the 2H crystal structure and the 3R crystal structure, and the half width is 1° or more. Further, the molybdenum sulfide particles may have a crystal structure other than the 2H crystal structure and the 3R crystal structure of molybdenum disulfide, such as a 1H crystal structure.

The molybdenum sulfide particles in the photothermal conversion material according to the present embodiment include the 3R crystal structure which is a metastable structure, and is thus considered to be more excellent in light absorption performance. Commercially available molybdenum disulfide particles contain molybdenum sulfide having a 2H crystal structure, whereas the molybdenum sulfide particles in the photothermal conversion material according to the present embodiment have the 3R crystal structure which is a metastable structure, which can be distinguished by a fact that, in the spectrum obtained from the powder X-ray diffraction (XRD) using the Cu-Kα rays as the X-ray source, both the peak in the vicinity of 39.5° and the peak in the vicinity of 49.5° include the synthetic peak of the 2H crystal structure and the 3R crystal structure.

A molybdenum sulfide in a two-dimensional image when the molybdenum sulfide particles in the photothermal conversion material according to the present embodiment are photographed with a transmission electron microscope (TEM) may have a particle shape, a spherical shape, a plate shape, a needle shape, a ribbon shape, or a string shape by visual observation or an image photograph, or may have a combination of these shapes. The molybdenum sulfide preferably has a string shape, and the shape of 50 primary particles of the molybdenum sulfide preferably has a size in the range of length (vertical)×width (horizontal)=50 nm to 1,000 nm×3 nm to 100 nm on average, more preferably a size in the range of 100 nm to 500 nm×5 nm to 50 nm, and particularly preferably a size in the range of 150 nm to 400 nm×10 nm to 20 nm. When the molybdenum sulfide has a string shape, the specific surface area of the molybdenum sulfide particles can be increased. Here, the string shape means an elongated shape. The aspect ratio of the primary particles of the molybdenum sulfide, that is, a value of (length (vertical))/(width (horizontal)) is preferably 1.2 to 1,200, more preferably 2 to 800, still more preferably 5 to 400, and particularly preferably 10 to 200 on average of 50 particles.

A conversion rate $R_C$ of the molybdenum sulfide particles in the photothermal conversion material according to the present embodiment to $MoS_2$ is preferably 70% or more, more preferably 80% or more, and particularly preferably 90% or more.

The molybdenum sulfide particles in the photothermal conversion material according to the present embodiment can be excellent in light absorption performance due to a large conversion rate $R_C$ to $MoS_2$.

The conversion rate $R_C$ of the molybdenum sulfide particles in the photothermal conversion material according to the present embodiment to $MoS_2$ can be obtained in the same manner as the conversion rate $R_C$ of the molybdenum sulfide powder to $MoS_2$.

(Method for Producing Molybdenum Sulfide Particles in Photothermal Conversion Material)

The molybdenum sulfide particles in the photothermal conversion material according to the present embodiment can be produced by heating molybdenum trioxide particles made of an aggregate of primary particles containing molybdenum trioxide having a β crystal structure at a temperature of 200° C. to 1,000° C. in the presence of a sulfur source.

Molybdenum trioxide particles used for producing the molybdenum sulfide particles in the photothermal conversion material according to the present embodiment are preferably made of an aggregate of the primary particles containing molybdenum trioxide having a β crystal structure. As the molybdenum trioxide particles, the molybdenum trioxide powder used in the method for producing a molybdenum sulfide powder is preferably used.

The molybdenum sulfide particles in the photothermal conversion material according to the present embodiment can be produced from the molybdenum trioxide powder by the same method as described in the method for producing a molybdenum sulfide powder.

With the method for producing a molybdenum trioxide powder, the molybdenum trioxide particles suitable for producing the molybdenum sulfide particles in the photothermal conversion material according to the present embodiment can be produced.

The photothermal conversion material according to the invention has the following aspects.

[51] A photothermal conversion material containing: a material containing molybdenum sulfide particles, in which the photothermal conversion material generates heat by absorbing light energy.

[52] The photothermal conversion material according to the above [51], in which the molybdenum sulfide particles have a median diameter $D_{50}$ of 10 nm to 1,000 nm, preferably 10 nm or more and 600 nm or less, more preferably 20 nm or more and 500 nm or less, and still more preferably 40 nm or more and 400 nm or less, which is obtained by a dynamic light scattering type particle diameter distribution measuring device.

[53] The photothermal conversion material according to the above [51] or [52], in which the molybdenum sulfide particles have a specific surface area of 10 $m^2/g$ or more, preferably 30 $m^2/g$ or more, and more preferably 40 $m^2/g$ or more, which is measured by a BET method.

[54] The photothermal conversion material according to any one of the above [51] to [53], in which in a radial distribution function of the molybdenum sulfide particles obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0, preferably 1.1 or more, and more preferably 1.2 or more.

[55] The photothermal conversion material according to any one of the above [51] to [54], in which the molybdenum sulfide particles contain molybdenum disulfide having a 3R crystal structure.

[56] The photothermal conversion material according to the above [55], in which the molybdenum sulfide particles contain molybdenum disulfide having a 2H crystal structure and a 3R crystal structure, and
  in a spectrum of the molybdenum sulfide particles obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

[57] The photothermal conversion material according to the above [55] or [56], in which primary particles of the molybdenum sulfide particles have a string shape, a ribbon shape, or a sheet shape.

[58] The photothermal conversion material according to any one of the above [55] to [57], in which the primary particles of the molybdenum sulfide particles have an average aspect ratio of 1.2 to 1,200, preferably 2 to 800, more preferably 5 to 400, and still more preferably 10 to 200.

[59] The photothermal conversion material according to any one of the above [55] to [58], in which a conversion rate $R_C$ of the molybdenum sulfide particles to $MoS_2$ is 70% or more, preferably 80% or more, and more preferably 90% or more.

[60] The photothermal conversion material according to any one of the above [51] to [59], in which the material containing molybdenum sulfide particles is a light-absorbing fluid containing a liquid and the molybdenum sulfide particles dispersed in the liquid.

[61] The photothermal conversion material according to the above [60], in which a main component of the liquid is water.

[62] The photothermal conversion material according to the above [60] or [61], in which the molybdenum sulfide particles are contained in an amount of 0.01% by mass or more with respect to the light-absorbing fluid.

<<Distillation Method>>

In a distillation method according to the present embodiment, the liquid is evaporated by irradiating the light-absorbing fluid of the photothermal conversion material with sunlight followed by heating.

At this time, it is considered that the entire photothermal conversion material does not generate heat uniformly, but individual molybdenum sulfide particles, which occupy a very small volume in the light-absorbing fluid, generate heat extremely locally and have a high temperature. Therefore, even when the temperature of the entire light-absorbing fluid is lower than the boiling point of the liquid in which the molybdenum sulfide particles are dispersed, liquid vapor is generated from the corresponding region. A part of the generated vapor reaches the surface of the light-absorbing fluid before condensing, and is discharged to the outside of the light-absorbing fluid. That is, by irradiating the light-absorbing fluid with the sunlight followed by heating, it is possible to generate a larger amount of vapor of the liquid as compared with a case where the liquid is independently irradiated with the sunlight and heated. Therefore, the distillation method according to the present embodiment enables distillation at a lower temperature in a shorter time than before, and improves energy utilization efficiency for sunlight.

In the distillation method according to the present embodiment, light energy can be absorbed with higher efficiency and a more excellent liquid vapor generation effect can be achieved by nanosizing the molybdenum sulfide particles. Specifically, the embodiment described in the section of the photothermal conversion material can be adopted.

In the distillation method according to the present embodiment, a treatment of concentrating or removing a specific component in a solution by generating steam, such as distillation of seawater or sewage, can be performed at a lower temperature than in the related art. All of these treatments are included in the distillation herein. Energy utilization efficiency of such distillation can be improved. Heat energy for the distillation may be supplied only from the sunlight, or a part of the heat energy may be supplied from another heat source. For example, a liquid to be distilled may be heated to a distillation temperature mainly by heat from another heat source, and the sunlight may be used as a main energy source that maintains the distillation.

The distillation method according to the invention has the following aspect.

[71] A distillation method including: evaporating the liquid by irradiating the photothermal conversion material according to any one of the above [60] to [62] with sunlight followed by heating.

EXAMPLES

Next, the invention will be described in more detail with reference to Examples, but the invention is not limited to the following Examples.

[Method for Measuring Average Particle Diameter of Primary Particles of Molybdenum Trioxide Powder]

The molybdenum trioxide particles constituting the molybdenum trioxide powder were photographed with a scanning electron microscope (SEM). The major axis (the Feret diameter of the longest portion observed) and the minor axis (the short Feret diameter in a direction perpendicular to the Feret diameter of the longest portion) of the minimum unit particles (that is, primary particles) constituting aggregates on a two-dimensional image were measured, and an average value thereof was defined as the primary particle diameter. The same operation was performed on 50 primary particles randomly selected, and the average particle diameter of the primary particles was calculated based on the average value of the primary particle diameters of these primary particles.

[Purity Measurement of Molybdenum Trioxide: XRF Analysis]

About 70 mg of a sample of the collected molybdenum trioxide powder was taken on a filter paper and covered with a PP film, and the composition of the molybdenum trioxide powder was analyzed using an X-ray fluorescence analyzer Primus IV (manufactured by Rigaku Corporation). The amount of molybdenum determined based on an XRF analysis result was determined in terms of molybdenum trioxide (% by mass) with respect to 100% by mass of the molybdenum trioxide powder.

[Crystal Structure Analysis: XRD Method]

A sample of the collected molybdenum trioxide powder or a sulfide thereof was filled in a holder for a measurement sample having a depth of 0.5 mm, set in a wide-angle X-ray diffraction (XRD) apparatus (Ultima IV manufactured by Rigaku Corporation), and was subjected to measurement under conditions of Cu/Kα rays, 40 kV/40 mA, a scanning speed of 2°/min, and a scanning range of 10° or more and 70° or less.

[Measurement of Specific Surface Area: BET Method]

A sample of the molybdenum trioxide powder or the molybdenum sulfide powder was measured with a specific surface area meter (BELSORP-mini manufactured by MicrotracBEL), and the surface area per gram of the sample measured based on the amount of the adsorbed nitrogen gas by the BET method was calculated as the specific surface area ($m^2/g$).

[Conversion Rate $R_C$ to $MoS_2$]

A black molybdenum sulfide powder was measured by X-ray diffraction (XRD). Next, by the reference intensity ratio (RIR) method, the conversion rate $R_C$ to $MoS_2$ was obtained according to the following equation (1) using the RIR value $K_A$ of molybdenum sulfide ($MoS_2$), the integrated intensity $I_A$ of the peak in the vicinity of $2\theta=14.4°\pm0.5°$ attributed to the plane (002) or the plane (003) of molybdenum sulfide ($MoS_2$), the RIR value $K_B$ of each molybdenum oxide ($MoO_3$ as a raw material, and $Mo_9O_{25}$, $Mo_4O_{11}$, $MoO_2$, etc. as reaction intermediates), and the integrated intensity $I_B$ of the strongest line peak of each molybdenum oxide ($MoO_3$ as a raw material, and $Mo_9O_{25}$, $Mo_4O_{11}$, $MoO_2$, etc. as reaction intermediates).

$$R_C(\%)=(I_A/K_A)/\Sigma(I_B/K_B))\times100 \qquad (1)$$

Here, values described in the inorganic crystal structure database (ICSD) were used as the RIR values, and integrated X-ray powder diffraction software (PDXL) (Rigaku Corporation) was used for analysis.

[Measurement of Extended X-ray Absorption Fine Structure (EXAFS)]

36.45 mg of the molybdenum sulfide powder and 333.0 mg of boron nitride were mixed in a mortar. 123.15 mg of the mixture was weighed and compression molded into a tablet having a diameter of 8 mm to obtain a measurement sample. Using the measurement sample, the extended X-ray absorption fine structure (EXAFS) was measured by a transmission method with BL5S1 of Aichi Synchrotron Radiation Center. Athena (Internet <URL: https://bruceravel.github.io/demeter/>) was used for the analysis.

[Measurement of Median Diameter $D_{50}$ of Molybdenum Sulfide Particles Constituting Molybdenum Sulfide Powder]

0.1 g of the molybdenum sulfide powder was added to 20 cc of acetone and subjected to an ultrasonic treatment in an ice bath for 4 hours, and then the concentration thereof was appropriately adjusted with acetone to a concentration within a measurable range of a dynamic light scattering type particle diameter distribution measuring device (Nanotrac Wave II manufactured by MicrotracBEL) to obtain a measurement sample. Using the measurement sample, the particle diameter distribution in the range of particle diameters of 0.0001 µm to 10 µm was measured by a dynamic light scattering type particle diameter distribution measuring device (Nanotrac Wave II manufactured by MicrotracBEL) to calculate the median diameter $D_{50}$.

However, for those have a median diameter $D_{50}$ more than 10 µm (Comparative Examples 1 and 2), similarly, a solution was adjusted, and the particle diameter distribution in the range of particle diameters of 0.015 µm to 500 µm was measured with a laser diffraction particle size distribution analyzer (SALD-7000 manufactured by Shimadzu Corporation) to calculate the median diameter $D_{50}$.

[Method for Observing Particle Shape of Molybdenum Sulfide Powder]

The molybdenum sulfide particles constituting the molybdenum sulfide powder were photographed with a transmission electron microscope (JEOL JEM1400), and 50 primary particles in the field of view of a two-dimensional image were observed to determine whether the primary particles have a string shape, a ribbon shape or a sheet shape.

Example 1

(production of Molybdenum Trioxide Powder Having β Crystal Structure)

1 kg of a transition aluminum oxide (activated alumina manufactured by Wako Pure Chemical Industries, Ltd., average particle diameter: 45 µm) and 1 kg of molybdenum trioxide (manufactured by TAIYO KOKO Co., Ltd.) were mixed with each other, and the mixture was then charged into a sagger and calcined at a temperature of 1,100° C. for 10 hours in the calcining furnace 2 of the production apparatus 1 shown in FIG. 1. During the calcining, outside air (blowing speed: 50 L/min, outside air temperature: 25° C.) was introduced from a side surface and a lower surface of the calcining furnace 2. Molybdenum trioxide was evaporated in the calcining furnace 2 and then cooled in the vicinity of the collection device 4 and precipitated as particles. An RHK simulator (manufactured by Noritake Co., Ltd.) was used as the calcining furnace 2, and a VF-5N dust collector (manufactured by AMANO Corporation) was used as the collection device 4.

After calcining, 1.0 kg of aluminum oxide, a blue powder, and 0.85 kg of the molybdenum trioxide powder collected by the collection device 4 were taken out from the sagger. The collected molybdenum trioxide powder had an average particle diameter of primary particles of 80 nm, and by X-ray fluorescence (XRF) measurement, it was found that the purity of molybdenum trioxide was 99.7%. The specific surface area (SA) of the molybdenum trioxide powder measured by a BET method was 44.0 m$^2$/g.

Figure 2:
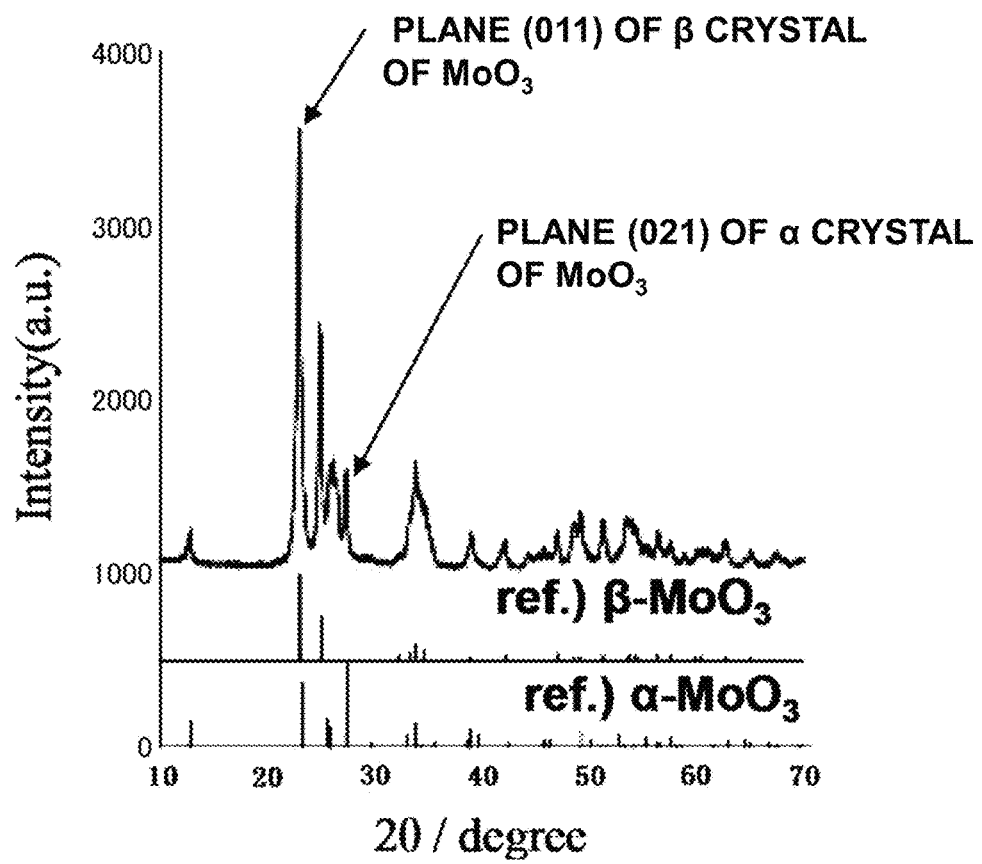
FIG. 2 shows a result of an X-ray diffraction (XRD) pattern of the molybdenum trioxide powder that is a raw material together with a standard pattern (α-$MoO_3$) of an α crystal and a standard pattern (β-$MoO_3$) of a β crystal of molybdenum trioxide.

Further, X-ray diffraction (XRD) of the molybdenum trioxide powder was measured. The result of an X-ray diffraction pattern is shown in FIG. 2 together with a standard pattern of an α crystal and a standard pattern of a β crystal of molybdenum trioxide. A peak attributed to the α crystal of $MoO_3$ and a peak attributed to the β crystal of $MoO_3$ were observed, and no other peaks were observed. Next, a peak intensity ratio (β (011)/α (021)) of the plane (011) of the β crystal (in the vicinity of 2θ: 23.01°, No. 86426 (inorganic crystal structure database (ICSD))) and the plane (021) of the α crystal (in the vicinity of 2θ: 27.32°, No. 166363 (inorganic crystal structure database (ICSD))) was obtained, and β (011)/α (021) was 5.2.

(Production of Molybdenum Sulfide Powder)

Figure 6:
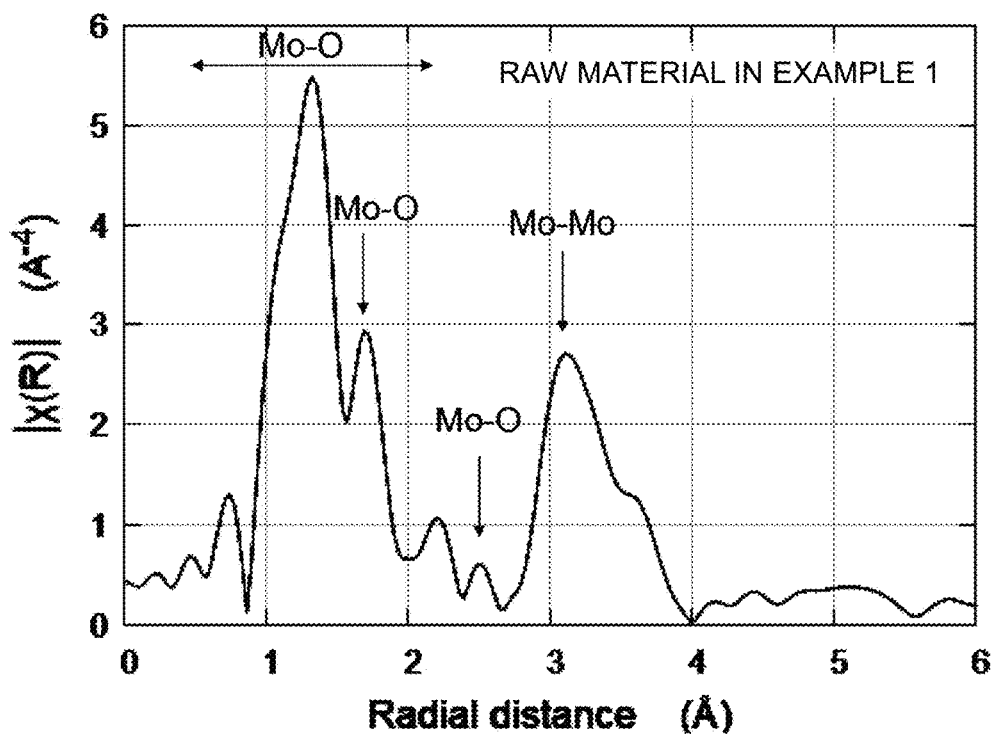
FIG. 6 is an extended X-ray absorption fine structure (EXAFS) spectrum of a K absorption edge of molybdenum measured using the molybdenum trioxide powder that is a raw material.

32.76 mg of the molybdenum trioxide powder and 333.0 mg of boron nitride were mixed in a mortar. 121.92 mg of the mixture was weighed and compression molded into a tablet having a diameter of 8 mm, and an extended X-ray absorption fine structure (EXAFS) was measured. FIG. 6 shows an extended X-ray absorption fine structure (EXAFS) spectrum of a K absorption edge of molybdenum. In a radial distribution function obtained from the spectrum, the ratio (I/II) of the peak intensity I caused by Mo—O to the peak intensity II caused by Mo—Mo was 2.0.

Figure 3:
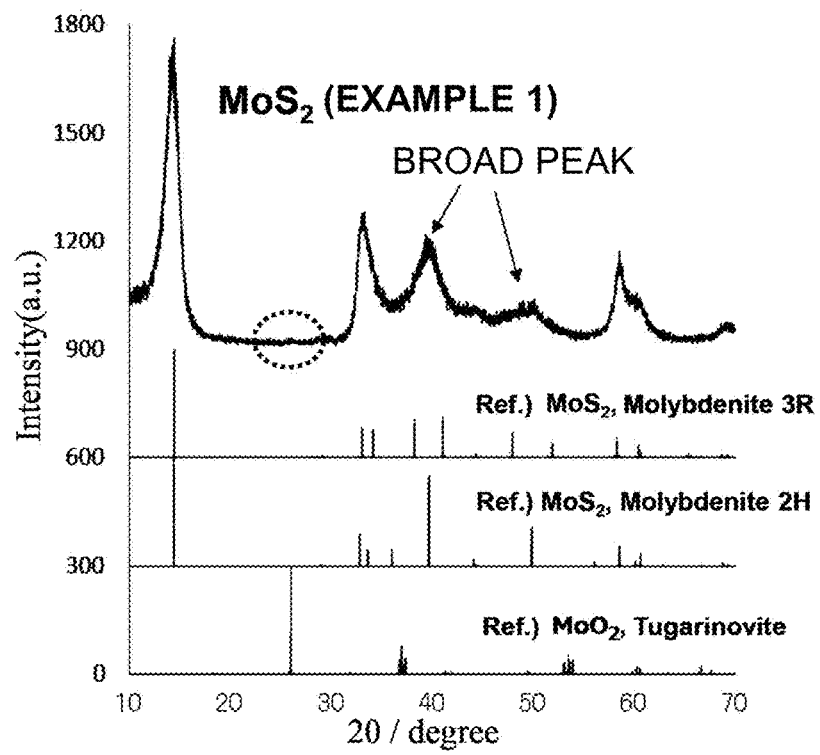
FIG. 3 shows a result of an X-ray diffraction (XRD) pattern of a molybdenum sulfide powder according to an embodiment of the invention together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

In a porcelain crucible, 1.00 g of the molybdenum trioxide powder and 1.57 g of a sulfur powder (manufactured by Kanto Chemical Co., Ltd.) were mixed with each other with a stirring rod such that the powder was uniform, and the mixture was calcined in a nitrogen atmosphere at 500° C. for 4 hours to obtain a black powder. Here, the S amount in the sulfur powder is 705 mol % with respect to the $MoO_3$ amount of 100 mol % in the molybdenum trioxide powder. FIG. 3 shows a result of an X-ray diffraction (XRD) pattern of the black power (molybdenum sulfide powder in Example 1) together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$) which are described in the inorganic crystal structure database (ICSD). Molybdenum dioxide ($MoO_2$) is a reaction intermediate.

In the X-ray diffraction (XRD) pattern in FIG. 3, only a peak attributed to molybdenum disulfide ($MoS_2$) was detected, and a peak not attributed to molybdenum disulfide ($MoS_2$) was not observed. That is, no peaks of reaction intermediates such as molybdenum dioxide ($MoO_2$), a by-product, were observed, and only a peak attributed to molybdenum disulfide ($MoS_2$) was observed, and thus it was found that the molybdenum sulfide powder in Example 1 had a conversion rate to $MoS_2$ of 99% or more, and the reaction with sulfur proceeded rapidly.

When crystal structure analysis of the molybdenum sulfide powder in Example 1 was performed by the X-ray diffraction (XRD), it was found that a 2H crystal structure and a 3R crystal structure were included. Half widths of the peak in the vicinity of 39.5° and the peak in the vicinity of 49.5° were as wide as 2.36° and 3.71°, respectively.

The specific surface area of the molybdenum sulfide powder in Example 1 was measured by the BET method and was 67.8 m$^2$/g.

The particle size distribution of the molybdenum sulfide powder in Example 1 was measured by a dynamic light scattering type particle diameter distribution measuring device to obtain the median diameter $D_{50}$, which was 170 nm.

Figure 7:
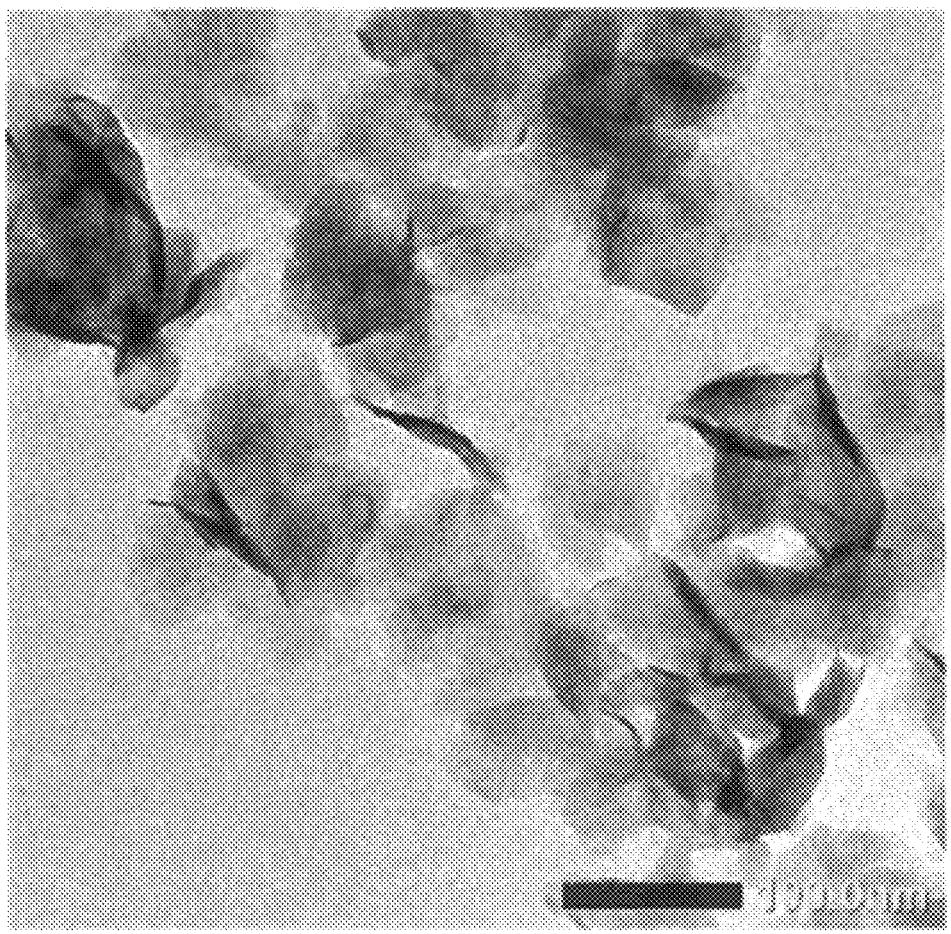
FIG. 7 is a TEM image of the molybdenum sulfide powder according to the embodiment of the invention.

FIG. 7 is a TEM image of the molybdenum sulfide powder according to Example 1. It was observed that a large number of ribbon-shaped or sheet-shaped molybdenum sulfides having a length of about 200 nm and a width of about 10 nm were contained.

[Oxygen Reduction Reaction (ORR) Activity]

A 5% Nafion (registered trademark) dispersion (DE520 CS type manufactured by FUJIFILM Wako Pure Chemical Corporation) was diluted with a mixed solvent containing ultrapure water and 1-propanol in a mass ratio of 1:1 to prepare 1 wt % Nafion (registered trademark).

A catalyst ink was prepared by adding 2.0 mg of the molybdenum sulfide powder according to Example 1 to a mixed solution of 100 µL of 1-hexanol and 4.1 µL of 1 wt % Nafion (registered trademark) and dispersion is performed by an ultrasonic treatment.

Next, a working electrode having a catalyst layer containing the molybdenum sulfide powder according to Example 1 was prepared by using a glassy carbon rod (manufactured by Tokai Carbon Co., Ltd., 5 mm in diameter×10 mm) as a base material for the working electrode, applying 5.0 µL of the dispersion liquid (catalyst ink) on the glassy carbon rod, and drying the glassy carbon rod at 60° C. for 1 hour. The amount of molybdenum sulfide supported on the glassy carbon rod was 0.1186 mg.

Electrochemical measurement was performed at a temperature of 30° C. by using a three-electrode cell manufactured by Miclab Co., Ltd. and a potentiostat manufactured by Toho Technical Research Co., Ltd., and using 0.1 M of $H_2SO_4$ as an electrolytic solution. A reversible hydrogen electrode (RHE) was used as a reference electrode, and a glassy carbon plate was used as a counter electrode. As a pretreatment, cyclic voltammetry of 300 cycles was performed in a nitrogen atmosphere at a scanning speed of 150 mV/s in the range of 0.05 V to 0.9 V.

Then, low-speed scan voltammetry was separately performed in an oxygen atmosphere and a nitrogen atmosphere at a scanning speed of 5 mV/s in the range of 0.2 V to 0.9 V ($O_2+4H^++4e^- \Rightarrow 2H_2O$).

The ORR current density (i/mAg$^{-1}$) was calculated based on a difference between current densities in the oxygen atmosphere and the nitrogen atmosphere. A result was shown in FIG. 4. From the result, the operating voltage (vs RHE) of the working electrode having a catalyst layer containing the molybdenum sulfide powder according to Example 1 was obtained to be 0.64 V.

Figure 9:
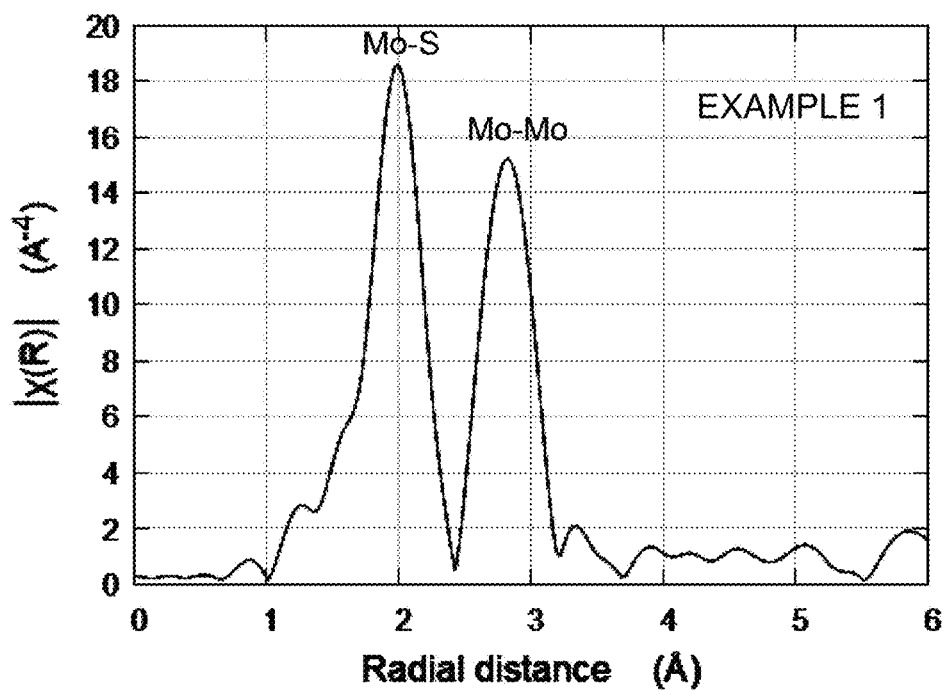
FIG. 9 is an extended X-ray absorption fine structure (EXAFS) spectrum of a K absorption edge of molybdenum measured using the molybdenum sulfide powder according to the embodiment of the invention.

The extended X-ray absorption fine structure (EXAFS) of the molybdenum sulfide powder according to Example 1 was measured. FIG. 9 shows an extended X-ray absorption fine structure (EXAFS) spectrum of a K absorption edge of molybdenum. In a radial distribution function obtained from the spectrum, the ratio (I/II) of the peak intensity I caused by Mo—S to the peak intensity II caused by Mo—Mo was 1.2.

Comparative Example 1

The oxygen reduction reaction (ORR) activity was evaluated using a molybdenum sulfide reagent manufactured by Kanto Chemical Co., Ltd. as a molybdenum sulfide powder according to Comparative Example 1. The evaluation method is the same as in a case of the molybdenum sulfide powder according to Example 1. A result was shown in FIG. 4. From the result, the operating voltage (vs RHE) of a working electrode obtained from the molybdenum sulfide powder according to Comparative Example 1 was obtained to be 0.46 V.

Figure 5:
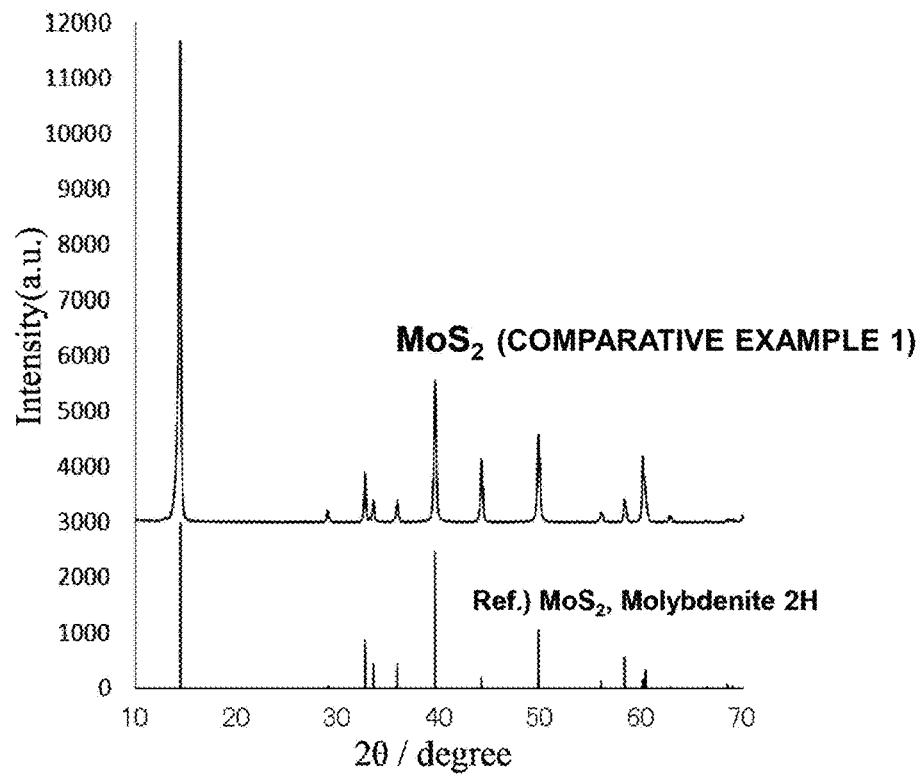
FIG. 5 shows a result of an X-ray diffraction (XRD) pattern of a molybdenum sulfide powder according to Comparative Example together with the diffraction pattern of a 2H crystal structure of molybdenum disulfide ($MoS_2$).

Further, FIG. 5 shows a result of an X-ray diffraction pattern of the molybdenum sulfide reagent according to Comparative Example 1 together with a diffraction pattern of a molybdenum sulfide having a 2H crystal structure. It was found that the molybdenum sulfide reagent according to Comparative Example 1 was a molybdenum sulfide having a 2H crystal structure of 99% or more. Half widths of the peak in the vicinity of 39.5° and the peak in the vicinity of 49.5° were as narrow as 0.23° and 0.22°, respectively.

For the molybdenum sulfide powder according to Comparative Example 1, the specific surface area (SA), the ratio (I/II) of the peak intensity I caused by Mo—S to the peak intensity II caused by Mo—Mo obtained based on measurement of the extended X-ray absorption fine structure (EX-AFS) of the K absorption edge of molybdenum, and the median diameter $D_{50}$ were obtained in the same manner as in the molybdenum sulfide powder according to Example 1. Results are shown in Table 1.

Figure 8:
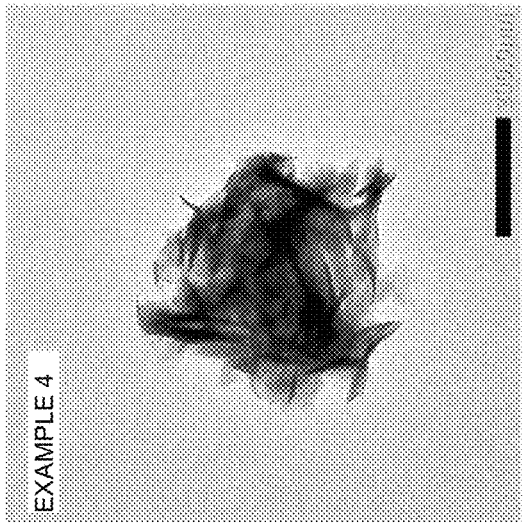
FIG. 8 is TEM images of molybdenum sulfide powders according to Examples and Comparative Examples.
Figure 8:
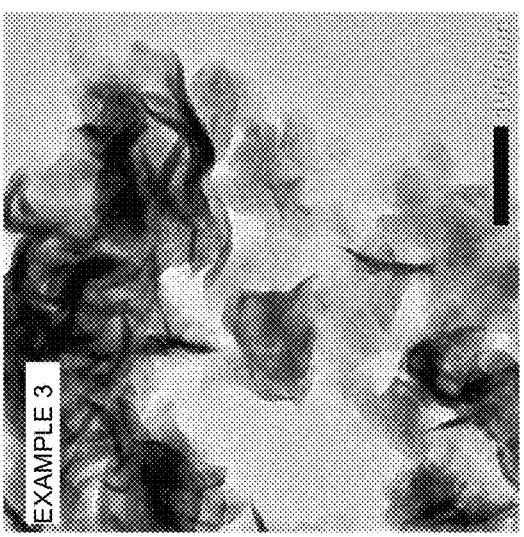
Figure 8:
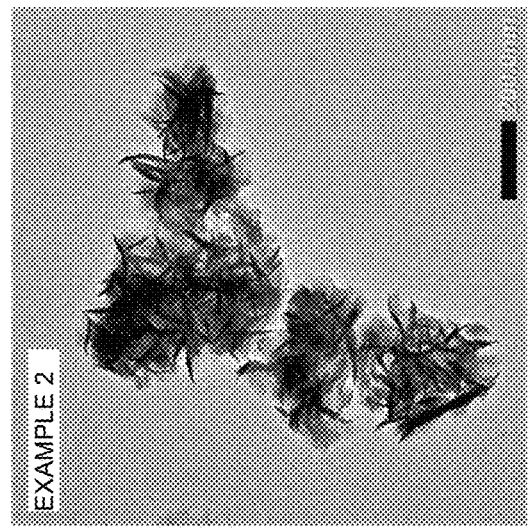
Figure 8:
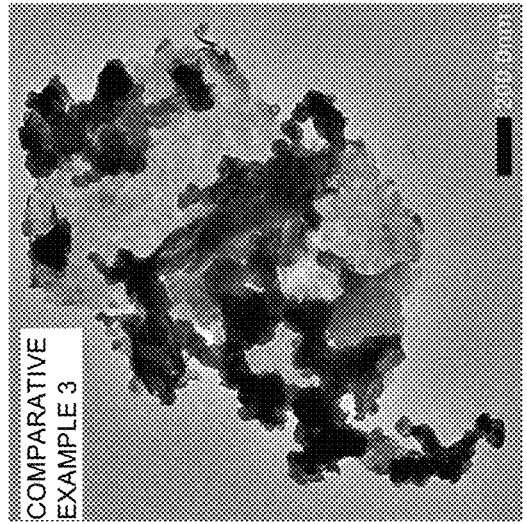
Figure 8:
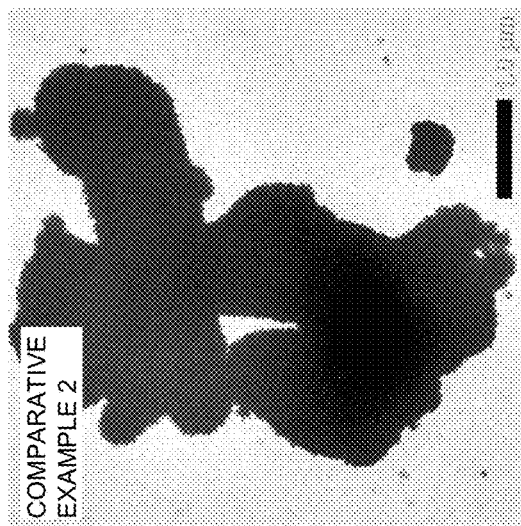
Figure 8:
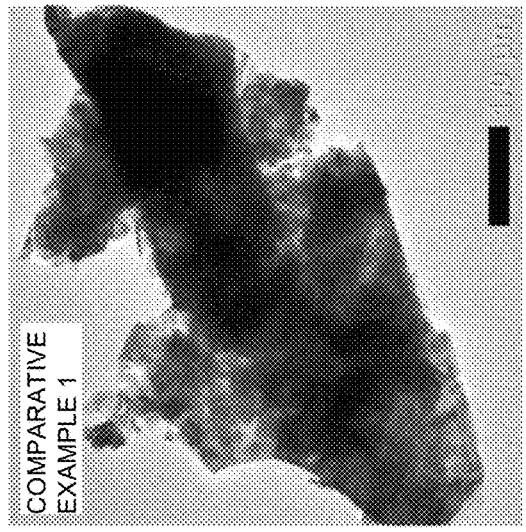

FIG. 8 shows a TEM image of the molybdenum sulfide powder according to Comparative Example 1. The particle shape was amorphous, and no string-shaped, ribbon-shaped or sheet-shaped molybdenum sulfides were observed.

Example 2

A molybdenum sulfide powder according to Example 2 was produced in the same manner as in Example 1 except that the mixing of 1.00 g of the molybdenum trioxide powder and 1.57 g of the sulfur powder in Example 1 was changed to mixing of 1.00 g of the molybdenum trioxide powder and 3.14 g of the sulfur powder, and the calcining of the molybdenum trioxide powder and the sulfur powder at 500° C. for 4 hours was changed to calcining of the molybdenum trioxide powder and the sulfur powder at 400° C. for 4 hours. Here, the S amount in the sulfur powder is 1410 mol % with respect to the $MoO_3$ amount of 100 mol % of the molybdenum trioxide powder.

In an X-ray diffraction (XRD) pattern of the molybdenum sulfide powder in Example 2, only a peak attributed to molybdenum disulfide ($MoS_2$) was detected, and a peak not attributed to molybdenum disulfide ($MoS_2$) was not observed. That is, no by-products were detected. It was found that the conversion rate to $MoS_2$ was 99% or more, and the reaction with sulfur occurred rapidly. Further, when crystal structure analysis of the molybdenum sulfide powder according to Example 2 was performed by X-ray diffraction (XRD), it was found that a 2H crystal structure and a 3R crystal structure were included. Half widths of the peak in the vicinity of 39.5° and the peak in the vicinity of 49.5° were as wide as 2.38° and 3.29°, respectively.

For the molybdenum sulfide powder according to Example 2, the specific surface area (SA), the ratio (I/II) of the peak intensity I caused by Mo—S to the peak intensity II caused by Mo—Mo obtained based on measurement of the extended X-ray absorption fine structure (EXAFS) of the K absorption edge of molybdenum, and the median diameter $D_{50}$ were obtained in the same manner as in the molybdenum sulfide powder according to Example 1. Results are shown in Table 1.

FIG. 8 shows a TEM image of the molybdenum sulfide powder according to Example 2. It was observed that a large number of string-shaped molybdenum sulfides having a length of about 200 nm and a width of about 10 nm were contained.

The oxygen reduction reaction (ORR) activity of the molybdenum sulfide powder according to Example 2 was evaluated in the same manner as in the case of the molybdenum sulfide powder according to Example 1. The operating voltage (vs RHE) of a working electrode obtained from the molybdenum sulfide powder according to Example 2 was obtained to be 0.65 V.

Example 3

A molybdenum sulfide powder according to Example 3 was produced in the same manner as in Example 1 except that the calcining of the molybdenum trioxide powder and the sulfur powder at 500° ° C. for 4 hours in Example 1 was changed to calcining at 400° C. for 4 hours.

In an X-ray diffraction (XRD) pattern of the molybdenum sulfide powder according to Example 3, only a peak attributed to molybdenum disulfide ($MoS_2$) was detected, and a peak not attributed to molybdenum disulfide ($MoS_2$) was not observed. That is, no by-products were detected. Further, when crystal structure analysis of the molybdenum sulfide powder according to Example 3 was performed by X-ray diffraction (XRD), it was found that a 2H crystal structure and a 3R crystal structure were included. Half widths of the peak in the vicinity of 39.5° and the peak in the vicinity of 49.5° were as wide as 2.40° and 3.43°, respectively.

For the molybdenum sulfide powder according to Example 3, the specific surface area (SA), the ratio (I/II) of the peak intensity I caused by Mo—S to the peak intensity II caused by Mo—Mo obtained based on measurement of the extended X-ray absorption fine structure (EXAFS) of the K absorption edge of molybdenum, and the median diameter $D_{50}$ were obtained in the same manner as in the molybdenum sulfide powder according to Example 1. Results are shown in Table 1.

FIG. 8 shows a TEM image of the molybdenum sulfide powder according to Example 3. It was observed that a large number of string-shaped molybdenum sulfides having a length of about 150 nm and a width of about 10 nm were contained.

The oxygen reduction reaction (ORR) activity of the molybdenum sulfide powder according to Example 3 was evaluated in the same manner as in the case of the molybdenum sulfide powder according to Example 1. The operating voltage (vs RHE) of a working electrode obtained from the molybdenum sulfide powder according to Example 3 was obtained to be 0.63 V.

Example 4

5.00 g of the molybdenum trioxide powder obtained in Example 1 was charged into a porcelain crucible and calcined again at 400° C. for 4 hours, and 1.00 g of the re-calcined molybdenum trioxide powder and 1.57 g of sulfur powder were mixed and calcined in a nitrogen atmosphere at 400° ° C. for 4 hours to produce a black molybdenum sulfide powder according to Example 4.

As a result of crystal structure analysis of the molybdenum sulfide powder according to Example 4 by X-ray diffraction (XRD), it was found that the conversion rate to $MoS_2$ was 90%, and the reaction with sulfur proceeded rapidly. Further, when the crystal structure analysis of the molybdenum sulfide powder according to Example 4 was performed by the X-ray diffraction (XRD), it was found that a 2H crystal structure and a 3R crystal structure were included. Half widths of the peak in the vicinity of 39.5° and the peak in the vicinity of 49.5° were as wide as 2.40° and 3.43°, respectively.

In XRD measurement, a peak attributed to molybdenum dioxide ($MoO_2$), a reaction intermediate, was observed. This was described in Table 1 as "Yes" for by-product.

For the molybdenum sulfide powder according to Example 4, the specific surface area (SA), the ratio (I/II) of the peak intensity I caused by Mo—S to the peak intensity II caused by Mo—Mo obtained based on measurement of the extended X-ray absorption fine structure (EXAFS) of the K absorption edge of molybdenum, and the median diameter $D_{50}$ were obtained in the same manner as in the molybdenum sulfide powder according to Example 1. Results are shown in Table 1.

FIG. 8 shows a TEM image of the molybdenum sulfide powder according to Example 4. It was observed that a large number of string-shaped molybdenum sulfides having a width of about 10 nm and a length of about 200 nm were contained.

The oxygen reduction reaction (ORR) activity of the molybdenum sulfide powder according to Example 4 was evaluated in the same manner as in the case of the molybdenum sulfide powder according to Example 1. The operating voltage (vs RHE) of a working electrode obtained from the molybdenum sulfide powder according to Example 4 was obtained to be 0.62 V.

Comparative Example 2

Figure 10:
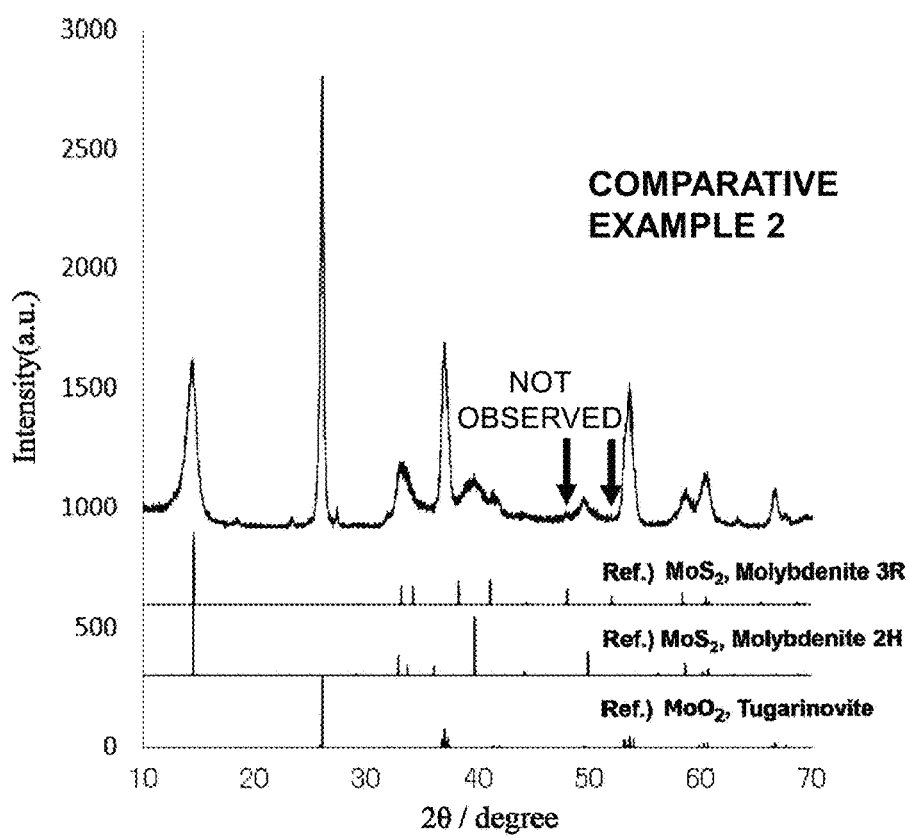
FIG. 10 shows a result of an X-ray diffraction (XRD) pattern of a molybdenum sulfide powder according to Comparative Example 2 together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

In a porcelain crucible, 1.00 g of a molybdenum trioxide powder ($MoO_3$) manufactured by TAIYO KOKO Co., Ltd. and 1.57 g of a sulfur powder (manufactured by Kanto Chemical Co., Ltd.) were mixed with each other with a stirring rod such that the powder was uniform, and the mixture was calcined in a nitrogen atmosphere at 400° C. for 4 hours to obtain a black powder. FIG. 10 shows a result of an X-ray diffraction (XRD) pattern of the black powder (molybdenum sulfide powder according to Comparative Example 2) together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

In the X-ray diffraction (XRD) pattern in FIG. 10, a peak attributed to molybdenum disulfide ($MoS_2$) having the 2H crystal structure and a peak attributed to molybdenum dioxide ($MoO_2$) were detected, but no peak attributed to molybdenum disulfide ($MoS_2$) having the 3R crystal structure was observed. Half widths of the peak in the vicinity of 39.5° and the peak in the vicinity of 49.5° were 1.73° and 0.82°, respectively. The molybdenum sulfide powder according to Comparative Example 2 contained a reaction intermediate ($MoO_2$) and had a low conversion rate to $MoS_2$ of 53%.

The raw material molybdenum trioxide powder ($MoO_3$) (manufactured by TAIYO KOKO Co., Ltd.) has only an α crystal structure and does not have a β crystal structure. Further, the average particle diameter of the molybdenum trioxide powder ($MoO_3$) is as large as about 10 μm. These are considered to be reasons why the conversion rate to $MoS_2$ is low.

For the molybdenum sulfide powder according to Comparative Example 2, the specific surface area (SA), the ratio (I/II) of the peak intensity I caused by Mo—S to the peak intensity II caused by Mo—Mo obtained based on measurement of the extended X-ray absorption fine structure (EXAFS) of the K absorption edge of molybdenum, and the median diameter $D_{50}$ were obtained in the same manner as in the molybdenum sulfide powder according to Example 1. Results are shown in Table 1.

FIG. 8 shows a TEM image of the molybdenum sulfide powder according to Comparative Example 2. The particle shape was amorphous, and no string-shaped molybdenum sulfides were observed.

The oxygen reduction reaction (ORR) activity of the molybdenum sulfide powder according to Comparative Example 2 was evaluated in the same manner as in the case of the molybdenum sulfide powder according to Example 1. The operating voltage (vs RHE) of a working electrode obtained from the molybdenum sulfide powder according to Comparative Example 2 was obtained to be 0.41 V.

Comparative Example 3

A black powder was obtained in the same manner as in Example 1 except that the mixing of 1.00 g of the molybdenum trioxide powder and 1.57 g of sulfur powder in Example 1 was changed to mixing of 1.00 g of the molybdenum trioxide powder and 0.79 g of sulfur powder, and the calcining of the molybdenum trioxide powder and sulfur powder at 500° C. for 4 hours was changed to calcining of the molybdenum trioxide powder and sulfur powder at 400° C. for 4 hours. Here, the S amount in the sulfur powder is 355 mol % with respect to the $MoO_3$ amount of 100 mol % in the molybdenum trioxide powder.

Figure 11:
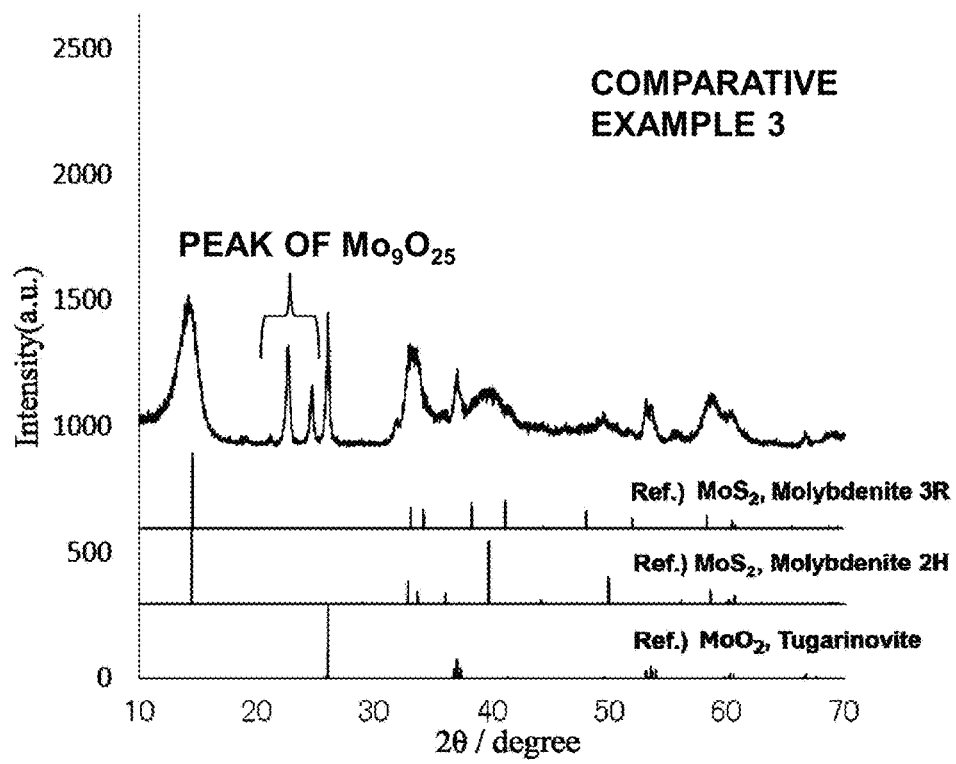
FIG. 11 shows a result of an X-ray diffraction (XRD) pattern of a molybdenum sulfide powder according to Comparative Example 3 together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

FIG. 11 shows a result of an X-ray diffraction (XRD) pattern of the black powder (molybdenum sulfide powder according to Comparative Example 3) together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

In the X-ray diffraction (XRD) pattern in FIG. 11, a peak attributed to molybdenum disulfide ($MoS_2$) having the 2H crystal structure and peaks attributed to reaction intermediates ($Mo_9O_{25}$ and $MoO_2$) were detected, but no peak attributed to molybdenum disulfide ($MoS_2$) having the 3R crystal structure was observed. Half widths of the peak in the vicinity of 39.5° and the peak in the vicinity of 49.5° were 2.41° and 0.50°, respectively. The molybdenum sulfide powder according to Comparative Example 3 contained reaction intermediates ($Mo_9O_{25}$ and $MoO_2$) and had a low conversion rate to $MoS_2$ of 62%.

For the molybdenum sulfide powder according to Comparative Example 3, the specific surface area (SA), the ratio (I/II) of the peak intensity I caused by Mo—S to the peak intensity II caused by Mo—Mo obtained based on measurement of the extended X-ray absorption fine structure (EXAFS) of the K absorption edge of molybdenum, and the median diameter $D_{50}$ were obtained in the same manner as in the molybdenum sulfide powder according to Example 1. Results are shown in Table 1.

FIG. 8 shows a TEM image of the molybdenum sulfide powder according to Comparative Example 3. The particle shape was amorphous, and no string-shaped molybdenum sulfides were observed.

The oxygen reduction reaction (ORR) activity of the molybdenum sulfide powder according to Comparative Example 3 was evaluated in the same manner as in the case of the molybdenum sulfide powder according to Example 1. The operating voltage (vs RHE) of a working electrode obtained from the molybdenum sulfide powder according to Comparative Example 3 was obtained to be 0.44 V.

Comparative Example 4

A molybdenum sulfide powder according to Comparative Example 4 was produced in the same manner as in Example 1 except that the calcining of the molybdenum trioxide powder and sulfur powder at 500° ° C. for 4 hours in Example 1 was changed to calcining at 300° ° C. for 4 hours.

Figure 12:
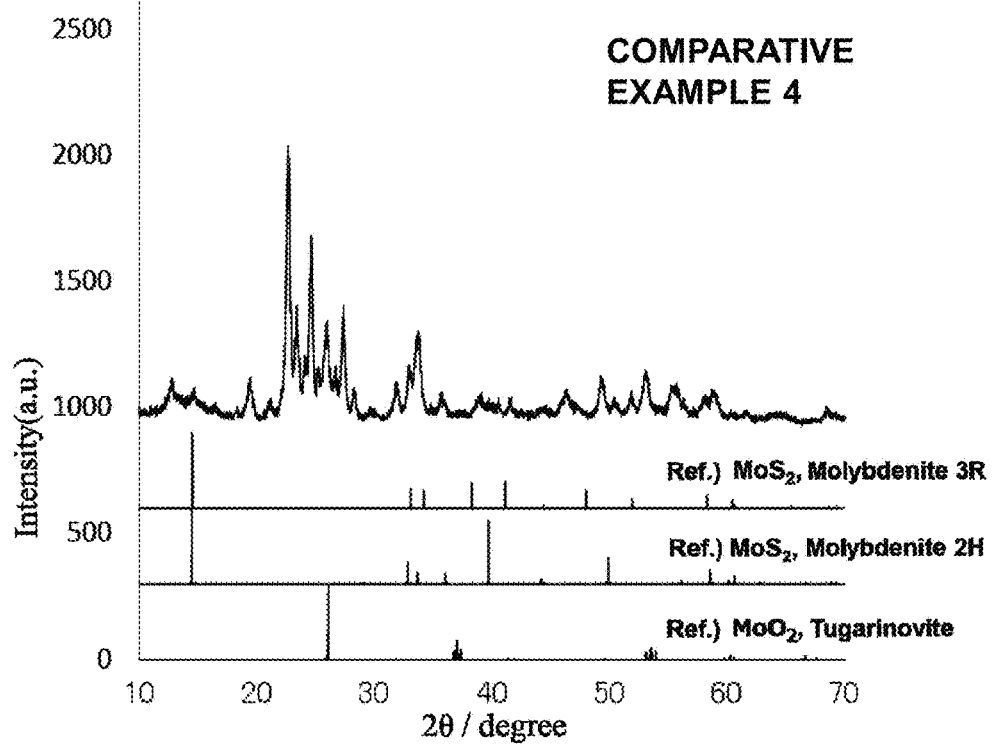
FIG. 12 shows a result of an X-ray diffraction (XRD) pattern of a molybdenum sulfide powder according to Comparative Example 4 together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

FIG. 12 shows a result of an X-ray diffraction (XRD) pattern of the molybdenum sulfide powder according to Comparative Example 4 together with a diffraction pattern of a 3R crystal structure of molybdenum disulfide ($MoS_2$), a diffraction pattern of a 2H crystal structure of molybdenum disulfide ($MoS_2$), and a diffraction pattern of molybdenum dioxide ($MoO_2$).

In the X-ray diffraction (XRD) pattern in FIG. 12, a peak attributed to a molybdenum trioxide powder ($MoO_3$) and peaks attributed to reaction intermediates ($Mo_9O_{25}$ and $MoO_2$) were detected. The peak in the vicinity of 39.5° and the peak in the vicinity of 49.5°, corresponding to molybdenum disulfide ($MoS_2$) having a 3R crystal structure and molybdenum disulfide ($MoS_2$) having a 2H crystal structure, were very small, and no half widths could be obtained. The molybdenum sulfide powder according to Comparative Example 4 contained reaction intermediates ($Mo_9O_{25}$ and $MoO_2$) as raw materials as well as the remaining molybdenum trioxide powder ($MoO_3$) and had a low conversion rate to $MoS_2$ of 8%.

For the molybdenum sulfide powder according to Comparative Example 4, the specific surface area (SA) and the median diameter $D_{50}$ were obtained in the same manner as in the molybdenum sulfide powder according to Example 1. Results are shown in Table 1. In a TEM image of the molybdenum sulfide powder according to Comparative Example 4, the particle shape was amorphous, and no string-shaped molybdenum sulfides were observed.

The oxygen reduction reaction (ORR) activity of the molybdenum sulfide powder according to Comparative Example 4 was evaluated in the same manner as in the case of the molybdenum sulfide powder according to Example 1. In the molybdenum sulfide powder according to Comparative Example 4, the observed amount of current was very small, and the operating voltage (vs RHE) of a working electrode could not be obtained.

As shown in the results of Table 1, the molybdenum sulfide powders according to Example 1 to Example 4 were superior in oxygen reduction reaction (ORR) activity to the molybdenum sulfide powders according to Comparative Example 1 to Comparative Example 4.

TABLE 1

| | 2H- | 3R- | Conversion rate to $MoS_2$ | By-product | Half width/° In the vicinity of 39.5° | Half width/° In the vicinity of 49.5° | $SA/m^2 \cdot g^{-1}$ | EXAFS ratio (I/II) | D50/nm | TEM | ORR activity* |
|---|---|---|---|---|---|---|---|---|---|---|---|
| Example 1 | Yes | Yes | 99%< | N.D. | 2.36 | 3.71 | 67.8 | 1.2 | 170 | Nano ribbon shape | A |
| Example 2 | Yes | Yes | 99%< | N.D. | 2.38 | 3.29 | 93.7 | 1.2 | 324 | Nano ribbon shape | A |
| Example 3 | Yes | Yes | 99%< | N.D. | 2.40 | 3.43 | 70.0 | 1.3 | 240 | Nano ribbon shape | A |
| Example 4 | Yes | Yes | 90% | Yes | 1.94 | 2.54 | 42.5 | 1.3 | 205 | Nano ribbon shape | A |
| Comparative Example 1 | Yes | No | — | — | 0.23 | 0.22 | 5.6 | 0.7 | 13340 | Amorphous | B |
| Comparative Example 2 | Yes | No | 53% | Yes | 1.73 | 0.82 | 19.4 | 0.9 | 11000 | Amorphous | B |

TABLE 1-continued

| | 2H- | 3R- | Conversion rate to MoS$_2$ | By-product | Half width/° In the vicinity of 39.5° | Half width/° In the vicinity of 49.5° | SA/m$^2 \cdot$g$^{-1}$ | EXAFS ratio (I/II) | D50/nm | TEM | ORR activity* |
|---|---|---|---|---|---|---|---|---|---|---|---|
| Comparative Example 3 | Yes | Yes | 62% | Yes | 2.41 | 0.50 | 38.1 | 1.3 | 432 | Amorphous | B |
| Comparative Example 4 | No | No | 8% | Yes | — | — | 25.3 (S precipitated) | — | 272 | Amorphous | B |

*A: operating voltage (vs RHE) is 0.6 V or more
B: operating voltage (vs RHE) is less than 0.6 V

[Heavy-Metal Adsorbent]

Example 5

A 0.1 mmol/L mixed aqueous solution of eight metal species including lithium chloride, sodium chloride, potassium chloride, magnesium chloride, calcium chloride, iron (III) chloride hexahydrate, nickel (II) chloride hexahydrate, and lead nitrate was prepared. As these reagents, reagents manufactured by Kanto Chemical Co., Ltd. were used.

1.0 mL of the mixed aqueous solution was loaded into a sample introduction portion of an ICP optical emission spectrometer (ICP-OES, Optima 8300 manufactured by PerkinElmer Co., Ltd.), and the content of each metal was measured. The results are shown in Table 2 as a metal content in an initial solution (1).

0.09 g of the molybdenum sulfide powder according to Example 1 was charged into 90 g of the initial solution (1), and the mixture was stirred with a lab shaker for 24 hours.

Then, the stirred solution was separated by filtration, 1.0 mL of the aqueous solution was loaded into the sample introduction portion of the ICP optical emission spectrometer (ICP-OES), and the content of each metal was measured. Results are shown in Table 2 as a metal remaining amount.

Further, a removal rate (%) shown in the following equation is shown in Table 2.

Removal rate (%)=(metal content in initial solution (1)−metal remaining amount)×100/metal content in initial solution (1)

When the calculated value of the removal rate (%) is a negative number, the value is shown as 0.0%.

A heavy-metal adsorbent according to Example 5 using molybdenum sulfide particles constituting the molybdenum sulfide powder according to Example 1 as an adsorbent had a large removal rate of Pb and Fe and highly selectively adsorbed heavy metals (Pb and Fe), and the adsorption performance for Pb was particularly excellent. Further, no macro-minerals (Na, Mg, K, and Ca) was adsorbed.

Example 6

0.09 g of the molybdenum sulfide reagent according to Comparative Example 1 was charged into 90 g of the initial solution (1) used in Example 5, and the mixture was stirred with a lab shaker for 24 hours.

Then, the stirred solution was separated by filtration, 1.0 mL of the aqueous solution was loaded into a sample introduction portion of an ICP optical emission spectrometer (ICP-OES), and the content of each metal was measured. Results are shown in Table 2 as a metal remaining amount.

Further, a removal rate (%) shown in the following equation is shown in Table 2.

Removal rate (%)=(metal content in initial solution (1)−metal remaining amount)×100/metal content in initial solution (1)

When the calculated value of the removal rate (%) is a negative number, the value is shown as 0.0%.

A heavy-metal adsorbent according to Example 6 using the molybdenum sulfide reagent according to Comparative Example 1 as an adsorbent selectively adsorbs heavy metals (Pb and Fe), but the adsorption performance for Pb was low. Further, the heavy-metal adsorbent according to Example 6 using the molybdenum sulfide reagent according to Comparative Example 1 as the adsorbent did not adsorb macro-minerals (Na, Mg, K, and Ca).

Comparative Example 5

The following evaluation experiment was carried out using zeolite (Zeolum (registered trademark) A-4 manufactured by Tosoh Corporation, spherical 14 mesh to 20 mesh) as a heavy-metal adsorbent according to Comparative Example 5.

Similarly to Example 5, a 0.1 mmol/L mixed aqueous solution of 8 kinds of metal species was prepared. As these reagents, reagents manufactured by Kanto Chemical Co., Ltd. were used.

1.0 mL of the mixed aqueous solution was loaded into a sample introduction portion of an ICP optical emission spectrometer (ICP-OES), and the content of each metal was measured. The results are shown in Table 2 as a metal content in an initial solution (2).

0.09 g of the zeolite was charged into 90 g of the initial solution (2), and the mixture was stirred with a lab shaker for 24 hours.

Then, the stirred solution was separated by filtration, 1.0 mL of the aqueous solution was loaded into the sample introduction portion of the ICP optical emission spectrometer (ICP-OES), and the content of each metal was measured. Results are shown in Table 2 as a metal remaining amount.

Further, a removal rate (%) shown in the following equation is shown in Table 2.

Removal rate (%)=(metal content in initial solution (2)−metal remaining amount)×100/metal content in initial solution (2)

When the calculated value of the removal rate (%) is a negative number, the value is shown as 0.0%.

The heavy-metal adsorbent (zeolite) according to Comparative Example 5 strongly adsorbed heavy metals (Pb and Fe), and also well adsorbed macro-minerals (Na, Mg, K, and Ca).

Comparative Example 6

The following evaluation experiment was carried out using activate carbon (Kuraray Coal (registered trademark) manufactured by Kuraray Chemical Co., Ltd.) as a heavy-metal adsorbent according to Comparative Example 6.

0.09 g of the activate carbon according to Comparative Example 6 was charged into 90 g of the initial solution (2) used in Comparative Example 5, and the mixture was stirred with a lab shaker for 24 hours.

Then, the stirred solution was separated by filtration, 1.0 mL of the aqueous solution was loaded into a sample introduction portion of an ICP optical emission spectrometer (ICP-OES), and the content of each metal was measured. Results are shown in Table 2 as a metal remaining amount.

Further, a removal rate (%) shown in the following equation is shown in Table 2.

Removal rate (%)=(metal content in initial solution (2)−metal remaining amount)×100/metal content in initial solution (2)

When the calculated value of the removal rate (%) is a negative number, the value is shown as 0.0%.

The activate carbon according to Comparative Example 6 selectively absorbed heavy metals (Pb and Fe), but the adsorption performance for Pb was low. Further, the heavy-metal adsorbent using the activate carbon according to Comparative Example 6 as an adsorbent did not adsorb macro-minerals (Na, Mg, K, and Ca).

TABLE 2

| | Metal species | | Na | Mg | K | Ca | Fe | Li | Ni | Pb |
|---|---|---|---|---|---|---|---|---|---|---|
| | Metal content in initial solution (1) | μg/L | 92 | 81 | 170 | 170 | 230 | 33 | 250 | 870 |
| Example 5 | Metal remaining amount | μg/L | 180 | 78 | 180 | 170 | 180 | 33 | 240 | 110 |
| | Removal rate | % | 0.0 | 3.7 | 0.0 | 0.0 | 21.7 | 0.0 | 4.0 | 87.4 |
| Example 6 | Metal remaining amount | μg/L | 180 | 81 | 190 | 180 | 150 | 32 | 250 | 730 |
| | Removal rate | % | 0.0 | 0.0 | 0.0 | 0.0 | 34.8 | 3.0 | 0.0 | 16.1 |
| | Metal content in initial solution (2) | μg/L | 91 | 77 | 170 | 160 | 210 | 32 | 240 | 930 |
| Comparative Example 5 | Metal remaining amount | μg/L | 940 | 22 | 85 | 47 | <10 | 23 | 67 | <50 |
| | Removal rate | % | 0.0 | 0.0 | 50.0 | 70.6 | >95.2 | 28.1 | 72.0 | >94.6 |
| Comparative Example 6 | Metal remaining amount | μg/L | 170 | 80 | 170 | 180 | 150 | 30 | 240 | 730 |
| | Removal rate | % | 0.0 | 0.0 | 0.0 | 0.0 | 28.6 | 6.3 | 0.0 | 21.5 |

[Evaluation of Adsorption for Heavy Metal (Lead)]

A reagent solution of lead (II) nitrate (manufactured by Kanto Chemical Co., Ltd.) was diluted with ion-exchanged water, and the diluted solution was adjusted such that the heavy metal concentration was about 1,000 ppb as an initial concentration.

40 g of the diluted solution was charged into a 50 mL tube. Here, 40 mg (0.1 wt %) of the heavy-metal adsorbents according to Example 5, Example 6, Comparative Example 5, and Comparative Example 6 were added separately to prepare experimental solutions, and each of the experimental solutions was stirred at a rotation speed of 15 rpm with a rotor mix RKVSD manufactured by Towalabo Corporation for each time of 3 h, 6 h, 12 h, and 24 h.

After the stirring was completed, about 24 g of each experimental solution was filtered through a syringe with a filter 25AS020AN manufactured by Toyo Roshi Kaisha, Ltd., and about 1 g of nitric acid (density: 1.38 g/mL) (electronics industrial grade product manufactured by Kanto Chemical Co., Ltd.) was added to prepare a stabilized sample solution.

The amount of the remaining heavy metals in the sample solution was measured with an ICP optical emission spectrometer (ICP-OES, Optima 8300 manufactured by PerkinElmer Co., Ltd.) (calibration curve method). Measured data in the sample solution was converted into the concentration of the experimental solution before diluting with nitric acid, and used as a remaining heavy metal concentration after the experiment. Results of the evaluation of adsorption for heavy metal (lead) are shown in Table 3. The detection limit is 50 ppb in each case.

TABLE 3

| | | Charged amount | Initial concentration | Remaining heavy metal concentration after experiment | | | |
|---|---|---|---|---|---|---|---|
| $Pb^{2+}$ | Adsorbent | wt % | ppb | 3 h | 6 h | 12 h | 24 h |
| | | | | ppb | | | |
| Example 5 | $MoS_2$ (Example 1) | 0.1 | 1040 | <50 | <50 | <50 | <50 |
| Example 6 | $MoS_2$ (Comparative Example 1) | 0.1 | 1040 | <50 | <50 | <50 | <50 |
| Comparative Example 5 | Zeolite | 0.1 | 1040 | 640 | 570 | 750 | 500 |

TABLE 3-continued

| $Pb^{2+}$ | Adsorbent | Charged amount wt % | Initial concentration ppb | Remaining heavy metal concentration after experiment | | | |
|---|---|---|---|---|---|---|---|
| | | | | 3 h | 6 h | 12 h | 24 h |
| | | | | ppb | | | |
| Comparative Example 6 | Activate carbon | 0.1 | 1040 | 660 | 690 | 720 | 670 |

[Evaluation of Adsorption For Heavy Metal (Mercury)]

The evaluation of adsorption for heavy metal (mercury) was performed in the same manner as the evaluation of adsorption for heavy metal (lead), except that lead (II) nitrate in the evaluation of adsorption for heavy metal (lead) was changed to mercury (II) chloride (manufactured by Kanto Chemical Co., Ltd.). Results of the evaluation of adsorption for heavy metal (mercury) are shown in Table 4. The detection limit is 50 ppb in each case.

TABLE 4

| $Hg^{2+}$ | Adsorbent | Charged amount wt % | Initial concentration ppb | Remaining heavy metal concentration after experiment | | | |
|---|---|---|---|---|---|---|---|
| | | | | 3 h | 6 h | 12 h | 24 h |
| | | | | ppb | | | |
| Example 5 | $MoS_2$ (Example 1) | 0.1 | 750 | <50 | <50 | <50 | <50 |
| Example 6 | $MoS_2$ (Comparative Example 1) | 0.1 | 750 | 230 | 180 | 120 | 140 |
| Comparative Example 5 | Zeolite | 0.1 | 750 | 790 | 760 | 770 | 720 |
| Comparative Example 6 | Activate carbon | 0.1 | 750 | 480 | 470 | 510 | 560 |

[Evaluation of Adsorption for Heavy Metal (Silver)]

The evaluation of adsorption for heavy metal (silver) was performed in the same manner as the evaluation of adsorption for heavy metal (lead), except that lead (II) nitrate in the evaluation of adsorption for heavy metal (lead) was changed to silver (I) nitrate (a silver standard solution manufactured by Kanto Chemical Co., Ltd.). Results of the evaluation of adsorption for heavy metal (silver) are shown in Table 5. The detection limit is 10 ppb in each case.

TABLE 5

| $Ag^+$ | Adsorbent | Charged amount wt % | Initial concentration ppb | Remaining heavy metal concentration after experiment | | | |
|---|---|---|---|---|---|---|---|
| | | | | 3 h | 6 h | 12 h | 24 h |
| | | | | ppb | | | |
| Example 5 | $MoS_2$ (Example 1) | 0.1 | 1040 | <10 | <10 | <10 | <10 |
| Example 6 | $MoS_2$ (Comparative Example 1) | 0.1 | 1040 | 260 | 190 | 62 | 120 |
| Comparative Example 5 | Zeolite | 0.1 | 1040 | 89 | 34 | 28 | 29 |
| Comparative Example 6 | Activate carbon | 0.1 | 1040 | 1040 | 910 | 630 | 450 |

[Evaluation of Adsorption for Heavy Metal (Gold)]

The evaluation of adsorption for heavy metal (gold) was performed in the same manner as the evaluation of adsorption for heavy metal (lead), except that lead (II) nitrate in the evaluation of adsorption for heavy metal (lead) was changed to tetrachloroauric (III) acid (a gold standard solution manufactured by Nacalai Tesque, Inc.). Results of the evaluation of adsorption for heavy metal (gold) are shown in Table 6. The detection limit is 100 ppb in each case.

TABLE 6

| AuCl$_4^-$ | Adsorbent | Charged amount wt % | Initial concentration ppb | Remaining heavy metal concentration after experiment | | | |
|---|---|---|---|---|---|---|---|
| | | | | 3 h | 6 h | 12 h | 24 h |
| | | | | ppb | | | |
| Example 5 | MoS$_2$ (Example 1) | 0.1 | 1040 | <100 | <100 | <100 | <100 |
| Example 6 | MoS$_2$ (Comparative Example 1) | 0.1 | 1040 | <100 | <100 | <100 | <100 |
| Comparative Example 5 | Zeolite | 0.1 | 1040 | 730 | 620 | 610 | 560 |
| Comparative Example 6 | Activate carbon | 0.1 | 1040 | <100 | <100 | <100 | <100 |

[Photothermal Conversion Material]

Example 7

20 g of ion-exchanged water was poured into a 100 ml disposable cup manufactured by Teraoka Corporation, 20 mg (0.1% by mass) of the molybdenum sulfide powder according to Example 1 was further added, and the mixture was ultrasonically stirred for 10 minutes to obtain a light-absorbing fluid of a photothermal conversion material according to Example 7. The area around the container was temporarily kept warm.

The photothermal conversion material according to Example 7 was irradiated with an illuminance of 1,000 W/m$^2$ using XES-40S3 manufactured by San-ei Electric Co., Ltd. as a pseudo sunlight generator.

After 1.5 hours from the start of irradiation, weighing was performed, irradiation was continued, the irradiation was performed for a total of 3 hours, and then weighing was performed again. A water evaporation amount of the photothermal conversion material according to Example 7, 1.5 hours after a steady state and calculated based on a difference between the two measured values, was 3.17 g.

The laboratory environment during the time period when the water evaporation amount was measured was a temperature of 22.2° C. to 22.4° C. and a humidity of 34%.

Without being irradiated with pseudo-sunlight, 20 g of ion-exchanged water poured into a 100 ml disposable cup manufactured by Teraoka Corporation was weighed in the same laboratory environment and at the same time as in Example 7, i.e., after 1.5 hours and 3 hours. A reference water evaporation amount calculated based on a difference between the two measured values was 0.132 g.

Example 8

20 g of ion-exchanged water was poured into a 100 ml disposable cup manufactured by Teraoka Corporation, 20 mg (0.1% by mass) of the molybdenum sulfide powder according to Comparative Example 1 was further added, and the mixture was ultrasonically stirred for 10 minutes to obtain a light-absorbing fluid of a photothermal conversion material according to Example 8. The area around the container was temporarily kept warm.

In the same manner as in Example 7, the water evaporation amount of the photothermal conversion material according to Example 8 was measured 1.5 hours after a steady state. Measurement results are shown in Table 7. Further, without being irradiated with pseudo-sunlight, 20 g of ion-exchanged water poured into a 100 ml disposable cup manufactured by Teraoka Corporation was weighed in the same laboratory environment and at the same time as in Example 8, i.e., after 1.5 hours and 3 hours. Table 7 shows a reference water evaporation amount calculated based on a difference between two measured values. Table 7 shows the laboratory environment when these operations were carried out.

Comparative Example 7

20 g of ion-exchanged water was poured into a 100 ml disposable cup manufactured by Teraoka Corporation, 20 mg (0.1% by mass) of titanium nitride (TiN) particles (median diameter D$_{50}$: 1,000 nm) manufactured by FUJIFILM Wako Pure Chemical Corporation were added, and the mixture was ultrasonically stirred for 10 minutes to obtain a light-absorbing fluid of a photothermal conversion material according to Comparative Example 7. The area around the container was temporarily kept warm.

In the same manner as in Example 7, a water evaporation amount of the photothermal conversion material according to Comparative Example 7 was measured 1.5 hours after a steady state. Measurement results are shown in Table 7. Further, as in Example 7 and Example 8, the reference water evaporation amount at this time and the laboratory environment are shown in Table 7.

Comparative Example 8

20 g of ion-exchanged water was poured into a 100 ml disposable cup manufactured by Teraoka Corporation, 7.45 mg (0.038% by mass) of conductive carbon black (Ketjen black (registered trademark), EC300J, median diameter D$_{50}$: 40 nm) manufactured by LION SPECIALTY CHEMICALS CO., Ltd. was added, and the mixture was ultrasonically stirred for 10 minutes to obtain a light-absorbing fluid of a photothermal conversion material according to Comparative Example 8. The area around the container was temporarily kept warm.

The specific gravity of molybdenum disulfide (MoS$_2$) is regarded as 5.1, and the specific density of the conductive carbon black (Ketjen black (registered trademark), EC300J) is regarded as 1.9, which is the same as that of carbon black, and the added volume of the conductive carbon black in Comparative Example 8 is the same as the added volume of molybdenum disulfide (MoS$_2$) in the cases of Example 7 and Example 8.

In the same manner as in Example 7, a water evaporation amount of the photothermal conversion material according to Comparative Example 8 was measured 1.5 hours after a steady state. Measurement results are shown in Table 7. Further, as in Example 7 and Example 8, the reference water evaporation amount at this time and the laboratory environment are shown in Table 7.

Comparative Example 9

20 g of ion-exchanged water was poured into a 100 ml disposable cup manufactured by Teraoka Corporation, 20 mg (0.1% by mass) of conductive carbon black (Ketjen black (registered trademark), EC300J, median diameter $D_{50}$: 40 nm) manufactured by LION SPECIALTY CHEMICALS CO., Ltd. was added, and the mixture was ultrasonically stirred for 10 minutes to obtain a light-absorbing fluid of a photothermal conversion material according to Comparative Example 9. The area around the container was temporarily kept warm.

In the same manner as in Example 7, a water evaporation amount of the photothermal conversion material according to Comparative Example 9 was measured 1.5 hours after a steady state. Measurement results are shown in Table 7. Further, as in Example 7 and Example 8, the reference water evaporation amount at this time and the laboratory environment are shown in Table 7.

Comparative Example 10

20 g of ion-exchanged water was poured into a 100 ml disposable cup manufactured by Teraoka Corporation, and the ion-exchanged water was used as a light-absorbing fluid of a photothermal conversion material according to Comparative Example 10. The area around the container was temporarily kept warm.

In the same manner as in Example 7, a water evaporation amount of the photothermal conversion material according to Comparative Example 10 was measured 1.5 hours after a steady state. Measurement results are shown in Table 7. Further, as in Example 7 and Example 8, the reference water evaporation amount at this time and the laboratory environment are shown in Table 7.

Thus, in the light-absorbing fluid of the photothermal conversion material according to the present embodiment, when titanium nitride particles and carbon black were dispersed at a temperature lower than the boiling point of a liquid in which molybdenum sulfide particles were dispersed, the liquid was able to be evaporated at a speed higher than that in a case of water alone in which the molybdenum sulfide particles were not dispersed. Therefore, with the light-absorbing fluid of the photothermal conversion material according to the present embodiment, distillation or the like can be performed rapidly at a lower temperature, and energy loss during the distillation or the like can be reduced.

In particular, it is shown that the photothermal conversion material according to Example 7 containing the molybdenum sulfide particles according to Example 1, which contain molybdenum disulfide having a 2H crystal structure and a 3R crystal structure and which have a median diameter $D_{50}$ of 10 nm to 1,000 nm, a specific surface area of 10 m²/g or more, and a ratio (I/II) of more than 1.0, generates a larger amount of water vapor, and has more excellent light absorption performance. It is considered that the specific surface area is increased and the light absorption efficiency is further increased by nanosizing the molybdenum sulfide particles.

(Measurement of Absorption Spectrum)

The light-absorbing fluid of the photothermal conversion material according to Example 7 containing molybdenum sulfide particles ($MoS_2$) constituting the molybdenum sulfide powder according to Example 1, the light-absorbing fluid of the photothermal conversion material according to Comparative Example 7 containing the titanium nitride

TABLE 7

| | Particles | Median diameter $D_{50}$/nm | Addition amount % by mass | Water evaporation amount in 1.5 h g | Reference water evaporation amount g | Final temperature ° C. | Laboratory environment |
|---|---|---|---|---|---|---|---|
| Example 7 | Molybdenum sulfide $MoS_2$ (Example 1) | 170 | 0.1 | 3.17 | 0.132 | 46.9 | 22.2° C. 34% RH to 22.4° C. 34% RH |
| Example 8 | Molybdenum sulfide $MoS_2$ (Comparative Example 1) | 13340 | 0.1 | 3.02 | 0.127 | 44.0 | 22.8° C. 34% RH to 23.1° C. 34% RH |
| Comparative Example 7 | Titanium nitride TiN | 1000 | 0.1 | 2.75 | 0.125 | 46.0 | 23.7° C. 39% RH to 23.2° C. 38% RH |
| Comparative Example 8 | Carbon black C | 40 | 0.038 | 2.94 | 0.128 | 46.2 | 21.7° C. 37% RH to 21.6° C. 36% RH |
| Comparative Example 9 | Carbon black C | 40 | 0.1 | 2.95 | 0.128 | — | 21.6° C. 36% RH to 23.0° C. 35% RH |
| Comparative Example 10 | No | — | — | 1.37 | 0.116 | 40.7 | 22.5° C. 41% RH to 23.1° C. 39% RH |

In the experiments of Examples 7 and 8 and Comparative Examples 7 to 10, it was found that since the reference water evaporation amount of the water-only sample performed in each laboratory environment hardly changed, each laboratory environment was the same, and the experiment results were not influenced.

The experiments in Examples 7 and 8 and Comparative Examples 7 to 10 were performed independently. Each laboratory environment during the time period when the water evaporation amount was measured was in the range of temperature 21.6° C. to 23.7° C. and humidity 34% to 41%. At the same time, it was found that since the reference water evaporation amount of the water-only sample performed in each laboratory environment hardly changes, each laboratory environment was the same, and the experiment results were not influenced.

As shown in Table 7, it is found that the water evaporation amounts of the photothermal conversion materials according to Example 7 and Example 8 in 1.5 hours are larger than the water evaporation amounts of the photothermal conversion materials according to Comparative Examples 7 to 10 in 1.5 hours, and a large amount of water vapor was generated.

(TiN) particles, and the light-absorbing fluid of the photothermal conversion material according to Comparative Example 9 containing the conductive carbon black (Ketjen black (registered trademark), EC300J) were diluted with ion-exchanged water, respectively, adjusted to a concentration of 0.2 mg/$H_2O$ g, and after ultrasonic stirring for 1 hour, the absorption spectrum at wavelengths from ultraviolet rays to near infrared rays was measured with a spectrometer U-4100 manufactured by Hitachi High-Tech Science Corporation.

Figure 13:
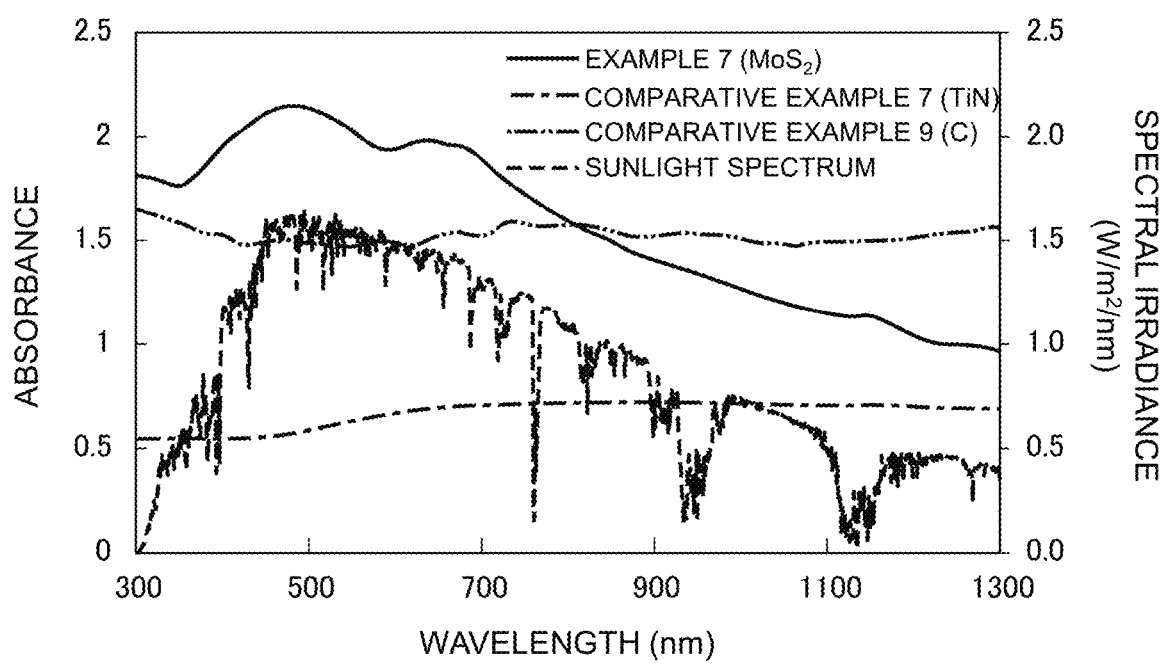
FIG. 13 is a graph showing absorption spectra of light-absorbing fluids of photothermal conversion materials according to Examples and Comparative Examples at a wavelength from ultraviolet rays to near infrared rays together with a solar light spectrum.

Measurement results of these absorption spectra are shown in FIG. 13 together with a sunlight spectrum (AM1.5G) conforming to IEC 60904-3 (equivalent standard JIS C8904-3).

The molybdenum sulfide particles are excellent as a sunlight-absorbing material because the molybdenum sulfide particles have high absorption in the vicinity of a wavelength of 350 nm to 800 nm, which occupies about 40% of energy of sunlight.

INDUSTRIAL APPLICABILITY

The molybdenum sulfide powder according to the invention has excellent oxygen reduction reaction (ORR) activity, and thus can be used as an electrode material.

Further, the heavy-metal adsorbent according to the invention has high adsorption performance for heavy metals and low adsorption capacity for mineral components, and thus can be suitably used for a water purifying material, a soot handling material, a heavy metal outflow prevention material, a precious metal recovery material, and the like.

The molybdenum sulfide particles used in the photothermal conversion material according to the invention are cheaper than gold, carbon nanotubes, titanium nitride and the like known as a sunlight-absorbing material. The photothermal conversion material according to the invention is excellent in light absorption performance, particularly sunlight absorption performance, and thus can be used in a distillation method of irradiating the photothermal conversion material with sunlight to perform heating in a thermal desalination facility, an alternative to an RO desalination facility, and a drinking water generator for disasters.

The invention claimed is:

1. A molybdenum sulfide powder comprising:
molybdenum disulfide having a 3R crystal structure, and molybdenum disulfide having a 2H crystal structure and a 3R crystal structure, wherein primary particles of molybdenum sulfide particles constituting the molybdenum sulfide powder have a string shape, a ribbon shape, or a sheet shape, and have a thickness in a range of 1 nm to 40 nm, and wherein the molybdenum sulfide powder has a specific surface area of 10 m$^2$/g or more measured by a BET method.

2. The molybdenum sulfide powder according to claim 1, wherein in a spectrum obtained from powder X-ray diffraction (XRD) using Cu-Kα rays as an X-ray source, both a peak in the vicinity of 39.5° and a peak in the vicinity of 49.5° include a synthetic peak of the 2H crystal structure and the 3R crystal structure, and a half width is 1° or more.

3. The molybdenum sulfide powder according to claim 1, which has a median diameter $D_{50}$ of 10 nm to 1000 nm obtained by a dynamic light scattering type particle diameter distribution measuring device.

4. The molybdenum sulfide powder according to claim 1, wherein in a radial distribution function obtained from an extended X-ray absorption fine structure (EXAFS) spectrum of a K absorption edge of molybdenum, a ratio (I/II) of peak intensity I caused by Mo—S to peak intensity II caused by Mo—Mo is more than 1.0.

5. A method for producing the molybdenum sulfide powder according to claim 1, comprising:
heating a molybdenum trioxide powder made of an aggregate of primary particles containing molybdenum trioxide having a β crystal structure at a temperature of 200° ° C. to 1,000° C. in the presence of a sulfur source.

6. The method for producing the molybdenum sulfide powder according to claim 5, wherein the molybdenum trioxide powder made of the aggregate of the primary particles containing molybdenum trioxide having a β crystal structure is heated at a temperature of 100° C. to 800° C. in the absence of the sulfur source, and then the molybdenum trioxide powder is heated at the temperature of 200° ° C. to 1,000° C. in the presence of the sulfur source.

7. The method for producing the molybdenum sulfide powder according to claim 5, wherein the primary particles of the molybdenum trioxide powder have an average particle diameter of 5 nm to 1,000 nm.

8. The method for producing the molybdenum sulfide powder according to claim 5, wherein S has an amount of 500 mol % or more in the sulfur source with respect to 100 mol % of the amount of MoO$_3$ in the molybdenum trioxide powder.

9. The method for producing the molybdenum sulfide powder according to claim 5, wherein a heating temperature in the presence of the sulfur source is 320° C. or higher.

10. A heavy-metal adsorbent comprising:
the molybdenum sulfide powder according to claim 1.

11. A photothermal conversion material, comprising:
a material containing the molybdenum sulfide powder according to claim 1, wherein
the photothermal conversion material generates heat by absorbing light energy.

12. The photothermal conversion material according to claim 11, which is a light-absorbing fluid containing a liquid and the molybdenum sulfide powder which is dispersed in the liquid.

13. The photothermal conversion material according to claim 12, wherein a main component of the liquid is water.

14. A distillation method comprising:
evaporating the liquid by irradiating the photothermal conversion material according to claim 12 with sunlight followed by heating.

15. An oxygen reduction catalyst comprising:
the molybdenum sulfide powder according to claim 1.

16. A catalyst ink comprising:
the oxygen reduction catalyst according to claim 15;
a polyelectrolyte; and
a solvent.

* * * * *